US009913121B2

(12) United States Patent
Johnson et al.

(10) Patent No.: US 9,913,121 B2
(45) Date of Patent: *Mar. 6, 2018

(54) SYSTEMS, DEVICES AND METHODS TO COMMUNICATE PUBLIC SAFETY INFORMATION

(71) Applicants: Jeffrey Douglas Johnson, Sisters, OR (US); James Vincent Petrizzi, Wilsonville, OR (US)

(72) Inventors: Jeffrey Douglas Johnson, Sisters, OR (US); James Vincent Petrizzi, Wilsonville, OR (US)

(73) Assignee: James Petrizzi, Wilsonville, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/726,611

(22) Filed: Jun. 1, 2015

(65) Prior Publication Data
US 2015/0264550 A1    Sep. 17, 2015

Related U.S. Application Data

(63) Continuation of application No. 13/717,739, filed on Dec. 18, 2012.

(51) Int. Cl.
G08B 1/08         (2006.01)
H04W 4/22        (2009.01)
G08B 25/00       (2006.01)
G08B 13/196      (2006.01)
G08B 25/01       (2006.01)
G08B 27/00       (2006.01)
G08B 25/10       (2006.01)

(52) U.S. Cl.
CPC ........ *H04W 4/22* (2013.01); *G08B 13/19621* (2013.01); *G08B 25/009* (2013.01); *G08B 25/016* (2013.01); *G08B 27/001* (2013.01); *G08B 25/10* (2013.01)

(58) Field of Classification Search
CPC . H04W 4/22; G08B 13/19621; G08B 27/001; G08B 25/016; G08B 25/009; G08B 25/10
USPC .............. 340/539.1, 539.25, 539.12, 539.13, 340/539.11, 425.5, 426.16, 426.1, 426.28, 340/540; 348/148; 455/404.1, 404.2, 455/456.1
See application file for complete search history.

(56) References Cited

U.S. PATENT DOCUMENTS

| | | |
|---|---|---|
| 6,204,844 B1 | 3/2001 | Fumarolo et al. |
| 6,233,517 B1 | 5/2001 | Froeberg |
| 6,722,399 B1 | 3/2004 | Granier |
| 6,748,320 B2 | 6/2004 | Jones |
| 6,831,556 B1 | 12/2004 | Boykin |
| 7,042,345 B2 | 5/2006 | Ellis |

(Continued)

Primary Examiner — Anh V La
(74) Attorney, Agent, or Firm — Muir Patent Law, PLLC

(57) ABSTRACT

Systems, devices and/or methods include communication of information, such as real-time rich media (e.g., video and audio) to, from and/or between a mobile first responder, such as remote public safety field personnel for public safety applications. Sensor data may be captured, stored, or transmitted and disseminated in real-time or on a schedule from field officers or their vehicles, based on one or more defined rules. In some examples, communication priority may be determined in response to detecting one or more events at a location of a mobile first responder.

18 Claims, 9 Drawing Sheets

(56) References Cited

U.S. PATENT DOCUMENTS

| | | |
|---|---|---|
| 7,298,289 B1 | 11/2007 | Hoffberg |
| 7,577,420 B2 | 8/2009 | Srinivasan et al. |
| 7,711,349 B2 | 5/2010 | Buckley et al. |
| 7,724,130 B2 | 5/2010 | Norstrom et al. |
| 8,116,723 B2 | 2/2012 | Kaltsukis |
| 9,135,808 B2 * | 9/2015 | Johnson ............... G08B 25/009 |
| 2004/0257208 A1 | 12/2004 | Huang et al. |
| 2005/0001720 A1 | 1/2005 | Mason et al. |
| 2005/0185936 A9 | 8/2005 | Lao et al. |
| 2005/0258942 A1 | 11/2005 | Manasseh et al. |
| 2005/0277421 A1 | 12/2005 | Ng |
| 2006/0055521 A1 | 3/2006 | Blanco et al. |
| 2006/0082730 A1 | 4/2006 | Franks |
| 2006/0132604 A1 | 6/2006 | Lao et al. |
| 2006/0274166 A1 | 12/2006 | Lee et al. |
| 2007/0109119 A1 | 5/2007 | Zhang et al. |
| 2007/0135980 A1 | 6/2007 | Plante |
| 2007/0188348 A1 | 8/2007 | Bauer et al. |
| 2007/0257987 A1 | 11/2007 | Wang |
| 2008/0077310 A1 * | 3/2008 | Murlidar ............. G08G 1/0962 701/117 |
| 2008/0219233 A1 | 9/2008 | Bolgiano et al. |
| 2008/0252487 A1 | 10/2008 | McClellan et al. |
| 2009/0058635 A1 * | 3/2009 | LaLonde ............ A61N 1/37282 340/539.11 |
| 2009/0174547 A1 | 7/2009 | Greene et al. |
| 2010/0177661 A1 | 7/2010 | Dailey |
| 2011/0029875 A1 | 2/2011 | Milch |
| 2011/0130112 A1 | 6/2011 | Saigh et al. |
| 2011/0237217 A1 | 9/2011 | Monks et al. |
| 2012/0147192 A1 | 6/2012 | Wright et al. |
| 2013/0203399 A1 * | 8/2013 | Gupta .................. H04W 28/12 455/418 |
| 2013/0215266 A1 | 8/2013 | Trundle et al. |
| 2014/0038668 A1 | 2/2014 | Vasavada et al. |
| 2014/0066050 A1 * | 3/2014 | Kotecha ............... H04W 88/06 455/422.1 |

* cited by examiner

SYSTEMS, DEVICES AND METHODS TO COMMUNICATE PUBLIC SAFETY INFORMATION

This application is a continuation application of U.S. patent application Ser. No.: 13/717,739 filed on Dec. 18, 2012, the disclosure of which is hereby incorporated by reference herein in its entirety.

BACKGROUND

For many years, police and other first responders and public safety personnel have had access to video and audio sensors in their vehicles and on their persons. This media data has been of inestimable value for forensic and investigatory analysis, and evidentiary purposes as it provides an unambiguous data log of events that occur during a public safety operation or action.

Police may have video and audio devices built into their vehicles to observe the environment of an operation or action; watchdog systems built into the electronics of their vehicles to determine speed, location, and other properties; sensors connected to their sirens and lights to record when they are deployed; detection equipment and video sensors built into their utility belts and related equipment that can record when they unholster their pepper spray, tasers, or firearms or when they release the safety features of their firearms and discharge them.

Typically, this data is not available for real-time dissemination to other remote field officers or central command to provide real-time warning of a dangerous situation or to help with real-time coordination of a public safety operation. This valuable sensor information may be left unreviewed or recorded on a storage system mounted within a vehicle and is later conveyed to a central station at the end of a shift when the officer and his her vehicle have returned to a precinct parking facility.

SUMMARY

Methods, systems and devices are disclosed to provide automatic communications and communication of sensor data obtained at a location of a mobile field officer or other mobile first responder. A method wireless communication, may comprise detecting one or more events at a location of a mobile first responder; determining a communication priority level in response to the detecting of one or more events; establishing a first wireless communication from the mobile first responder in a wireless communication system having a plurality of communication priority levels including the determined communication priority level, the determined wireless communication level being assigned to the first wireless communication.

The method may include determining a threat level to the mobile first responder based upon the detecting of the one or more events; and determining the communication priority level in response to the determined threat level.

The detecting one or more events may comprise detecting a change in the state of a weapon of the first responder.

The detecting one or more events may comprise detecting at least one of: unholstering a weapon, putting a safety mechanism of a weapon in an off state, firing a weapon and deploying a weapon.

The detecting one or more events may comprise detecting a stress level of the first responder.

The method of claim 6, wherein detecting the stress level of the first responder may comprise monitoring a heart rate of the first responder.

The detecting one or more events may comprise detecting the status of a vehicle associated with the first responder.

The detecting the status of the vehicle associated with the first responder may comprise detecting a speed of the vehicle.

The status of the vehicle associated with the first responder may comprise detecting a speed of the vehicle higher than a first value. The first value may be a fixed value or a value determined based upon a location of the vehicle.

The detecting of a speed of the vehicle may comprise determining that the vehicle has stopped.

The method may comprise determining locations that are typical for stopping a vehicle, and determining that the vehicle has stopped at a location that is not one of the locations determined to be typical for stopping a vehicle.

The detecting the status of the vehicle may comprise detecting an opening of a door of the vehicle.

The detecting the status of the vehicle may comprise detecting turning on at least one of a siren or emergency lights of the vehicle.

Detecting the status of the vehicle may comprise detecting a deployment of airbags.

The detecting the status of the vehicle may comprise detecting that the vehicle has been in an accident.

The plurality of communication priority levels of the wireless communication system may be used by the wireless communication system to determine a bandwidth or a quality of service of plural communication links of the wireless communication system.

The plurality of communication priority levels may be used by the communication system to determine which of plural communication links of the wireless communication system to terminate in the event of over congestion of the communication system.

The method may comprise a first wireless communication with the mobile first responder and an additional party, wherein the additional party is selected in response to the determined communication priority level.

The additional party is a central command station.

Establishing the first wireless communication with the first mobile responder may be automatically established in response to the detecting of the one or more events.

The additional party may be one or more additional first responders.

The one or more additional first responders may be selected for receiving the first wireless communication based upon respective one or more locations one or more additional first responders.

The one or more additional first responders may be selected for receiving the first wireless communication based upon an authority rank associated with the one or more additional first responders.

The additional party may select rules for receiving communications, and the method may include establishing a first wireless communication with the mobile first responder and the additional party in response to the determined communication priority level and the rules selected by the additional party.

Establishing the first wireless communication with the first mobile responder may be automatically established in response to the detecting of the one or more events.

The first wireless communication may transmit images taken from the location of the first responder. The images may be video images and/or still images.

The images taken from the location of the first responder may be transmitted in real time.

The method may include, at a location of a first responder, receiving a wireless communication request to establish a wireless communication with a communications device and a priority level associated with the wireless communication request; and determining whether to accept the wireless communication request to establish immediate communication with the first responder in response to the priority level.

The communications device may provide a first indication of the priority level associated with the wireless communication request to assist a first responder in determining whether or not to accept the wireless communication request.

A user interface of the communications device may be used to set one or more rules; and the method may comprise determining whether to accept the wireless communication request in response to the priority level and the one or more rules.

The methods may comprise selecting the first indication from a plurality of different types of indications in response to the setting of one or more rules.

The first indication may comprise at least one of a display, sound and vibration.

The first indication is a picture-in-picture within a display, such as a video display.

Accepting the wireless communication request may comprise expanding a size of the video in the display.

The methods may include a first rule set of one or more rules for a first time period and setting a second rule set of one or more rules for a second time period, the first rule set being different than the second rule set.

Methods may comprise, during the first time period, receiving a first wireless communication request to establish a wireless communication with the communications device and a first priority level associated with the first wireless communication request; and during the second time period, receiving a second wireless communication request to establish a wireless communication with the communications device and a first priority level associated with the second wireless communication request; in response to the first set of rules and the first priority level, accepting the first wireless communication request to establish immediate communication with the first responder; in response to the second set of rules and the second priority level, preventing or delaying the second wireless communication request to establish communication with the first responder.

Methods may comprise, during the second time period, receiving a third wireless communication request to establish a wireless communication with the communications device and a second priority level associated with the second wireless communication request; and in response to the second set of rules and the second priority level, accepting the third wireless communication request.

In response to the second set of rules and the second priority level, storing at the communications device a communication associated with the second wireless communication request.

The first indication may be an alphanumeric indication.

Methods may comprise detecting one or more events at a location of a first mobile first responder; establishing a first wireless communication between the first mobile responder and a second mobile first responder automatically in response to the detecting of the one or more events.

The first wireless communication may comprise transmission of images taken at the location of the first mobile first responder to the second mobile first responder.

Methods may comprise, via a user interface of a first device at the location of the first mobile first responder, setting one or more rules; and establishing the first wireless communication between the first mobile responder and the second mobile first responder automatically in response to the detecting of the one or more events and the setting of one or more rules.

The setting of one or more rules comprises selecting one or more events indicative of a threat to the mobile first responder, wherein upon detection of an event that has been selected, the first wireless communication is automatically established.

Setting one or more rules may comprise deselecting one or more of the selected one or more events so that detection of an event that has been deselected does not automatically establish the first wireless communication.

The detecting one or more events may comprise detecting a change in the state of a weapon of the first responder, unholstering a weapon, putting a safety mechanism of a weapon in an off state, firing a weapon and deploying a weapon, detecting a stress level of the first responder, monitoring a heart rate of the first responder, detecting the status of a vehicle associated with the first responder, detecting a speed of the vehicle, detecting a speed of the vehicle higher than a first value (the first value may be a fixed value or a value determined based upon a location of the vehicle), determining that the vehicle has stopped, determining locations that are typical for stopping a vehicle, determining that the vehicle has stopped at a location that is not one of the locations determined to be typical for stopping a vehicle, detecting an opening of a door of the vehicle, detecting turning on at least one of a siren or emergency lights of the vehicle, detecting a deployment of airbags, and/or detecting that the vehicle has been in an accident. Detecting one or more events may comprise analysis of video to determine data and/or events occurring in the video, such as gun drawn, license plate identification information (e.g., a license plate "number" which may include alphanumeric identifiers), officer running, officer prone, officer falling down, etc.

The second mobile first responder may be selected from a plurality of first responders.

Selecting of the second mobile first responder may include determining a location of the second mobile first responder and selecting the second mobile first responder in response to the determined location.

The second mobile first responder may be selected in response to being one of within a first distance of the first mobile first responder and within an estimated first time away from the first mobile first responder. The first distance may be a predetermined value. Or, the second mobile first responder may be selected in response to being closer than other mobile first responders.

Methods may include determining one or more events at a location of a mobile first responder; setting one or more rules via a user interface of a communications device; establishing a first wireless communication from the communications device at the location of first mobile responder automatically in response to the detecting of the one or more events and the one or more rules.

The first wireless communication may comprise transmission of images taken at the location of the first mobile first responder to the second mobile first responder.

The setting of one or more rules may comprise selecting a first time period and a first rule set of one or more rules associated with the second time period and a second time period and a second rule set of one or more rules associated with the second time period, the second set being different from the first set.

The setting of one or more rules may comprise providing information via the user interface indicating when the mobile first responder is on-duty.

The setting of one or more rules may comprise setting a first rule via the user interface to restrict automatically establishing wireless communications to a first group of personnel, and setting a second rule via the user interface to allow automatically establishing wireless communications to the first group of personnel and a second group of personnel.

The first group may be a first agency associated with the mobile first responder and the second group includes an agency different than the first agency.

The first and second agencies may be respectively associated with different geographical districts.

The first and second agencies are respectively associated with different governmental districts.

The first and second agencies may be different agencies of the following: police department, fire department, emergency medical services, and military.

Setting one or more rules via the user interface of the communication device may comprise selection one of plural modes of the communication device.

Example embodiments comprise systems and/or devices for implementing the disclosed methods.

DEFINITIONS a. "Rich media" refers to video, still images, audio and other information recorded or sensed from real world environments. Rich media may be, but need not be, conveyed by streaming data, such as periodically providing sensor data. "Rich media" as used herein may allow for, but does not require, the ability to interact with a user.

b. A "video" refers to motion pictures represented in analog and/or digital form. Examples of video include: television, movies, image sequences from a video camera or other observer, and computer-generated image sequences.

c. An "event" refers to one or more objects engaged in an activity. The event may be referenced with respect to a location and/or a time.

d. A "computer" may refer to one or more apparatus and/or one or more systems that are capable of accepting a structured input, processing the structured input according to prescribed rules, and producing results of the processing as output. Examples of a computer may include: a personal computer; a stationary and/or portable computer; a computer having a single processor, multiple processors, or multi-core processors, which may operate in parallel and/or not in parallel; a general purpose computer; a supercomputer; a mainframe; a super mini-computer, a mini-computer; a workstation; a micro-computer; a server; a client; an interactive television; a web appliance; a telecommunications device with internet access; a hybrid combination of a computer and an interactive television; a portable computer; a tablet personal computer (PC); a personal digital assistant (PDA); a portable telephone; application-specific hardware to emulate a computer and/or software, such as, for example, a digital signal processor (DSP), a field-programmable gate array (FPGA), an application specific integrated circuit (ASIC), an application specific instruction-set processor (ASIP), a chip, chips, or a chip set; a system-on-chip (SoC); a multi-processor system-on-chip (MPSoC); a programmable logic controller (PLC); a graphics processing unit (GPU); and an apparatus that may accept data, may process data in accordance with one or more stored software programs, may generate results, and typically may include input, output, storage, arithmetic, logic, and control units.

e. "Software" may refer to prescribed rules to operate a computer or a portion of a computer. Examples of software may include: code segments; instructions; applets; pre-compiled code; compiled code; interpreted code; computer programs; and programmed logic.

f. "Computer-readable medium" may refer to any storage device used for storing data accessible by a computer. Examples of a computer-readable medium may include: a magnetic hard disk; a floppy disk; an optical disk, such as a CD-ROM and a DVD; a magnetic tape; a flash removable memory; a memory chip; and/or other types of media that can store machine-readable instructions thereon.

g. "Computer system" may refer to a system having one or more computers, where each computer may include a computer-readable medium embodying software to operate the computer. Examples of a computer system may include: a distributed computer system for processing information via computer systems linked by a network; two or more computer systems connected together via a network for transmitting and/or receiving information between the computer systems; and one or more apparatuses and/or one or more systems that may accept data, may process data in accordance with one or more stored software programs, may generate results, and typically may include input, output, storage, arithmetic, logic, and control units.

h. A "network" may refer to a number of computers and associated devices (e.g., gateways, routers, switches, firewalls, address translators, etc.) that may be connected by communication facilities. A network may involve permanent connections such as cables or temporary connections such as those that may be made through telephone or other communication links. A network may further include hard-wired connections (e.g., coaxial cable, twisted pair, optical fiber, waveguides, etc.) and/or wireless connections (e.g., radio frequency waveforms, free-space optical waveforms, acoustic waveforms, etc.). Examples of a network may include: an internet, such as the Internet; an intranet; a local area network (LAN); a wide area network (WAN); a metropolitan area network (MAN); a body area network (MAN); and a combination of networks, such as an Internet and an intranet. Exemplary networks may operate with any of a number of protocols, such as Internet protocol (IP), asynchronous transfer mode (ATM), and/or synchronous optical network (SONET), user datagram protocol (UDP), IEEE 802.x, etc.

i. A "mobile device" refers to a device whose typical operation does not require being fixed to an immobile structure. "Mobile device" may be, but does not require, an ability to be carried by a human. For example, a mobile device may be a computer system installed in a vehicle. Examples of mobile devices include a portable computer; a tablet personal computer (PC); a personal digital assistant (PDA); a portable telephone; the combination of a hand held user interface and a computer installed in a vehicle having a wireless connection with the hand held user interface.

j. "first responder" means any emergency and/or public service personnel, including police, firemen, emergency medical services personnel (e.g., ambulance and rescue personnel), military, and people of other organizations that function to react to situations in real time in the interest of the public, such as public safety.

DETAILED DESCRIPTION OF THE PREFERRED EMBODIMENTS

Figure 1:
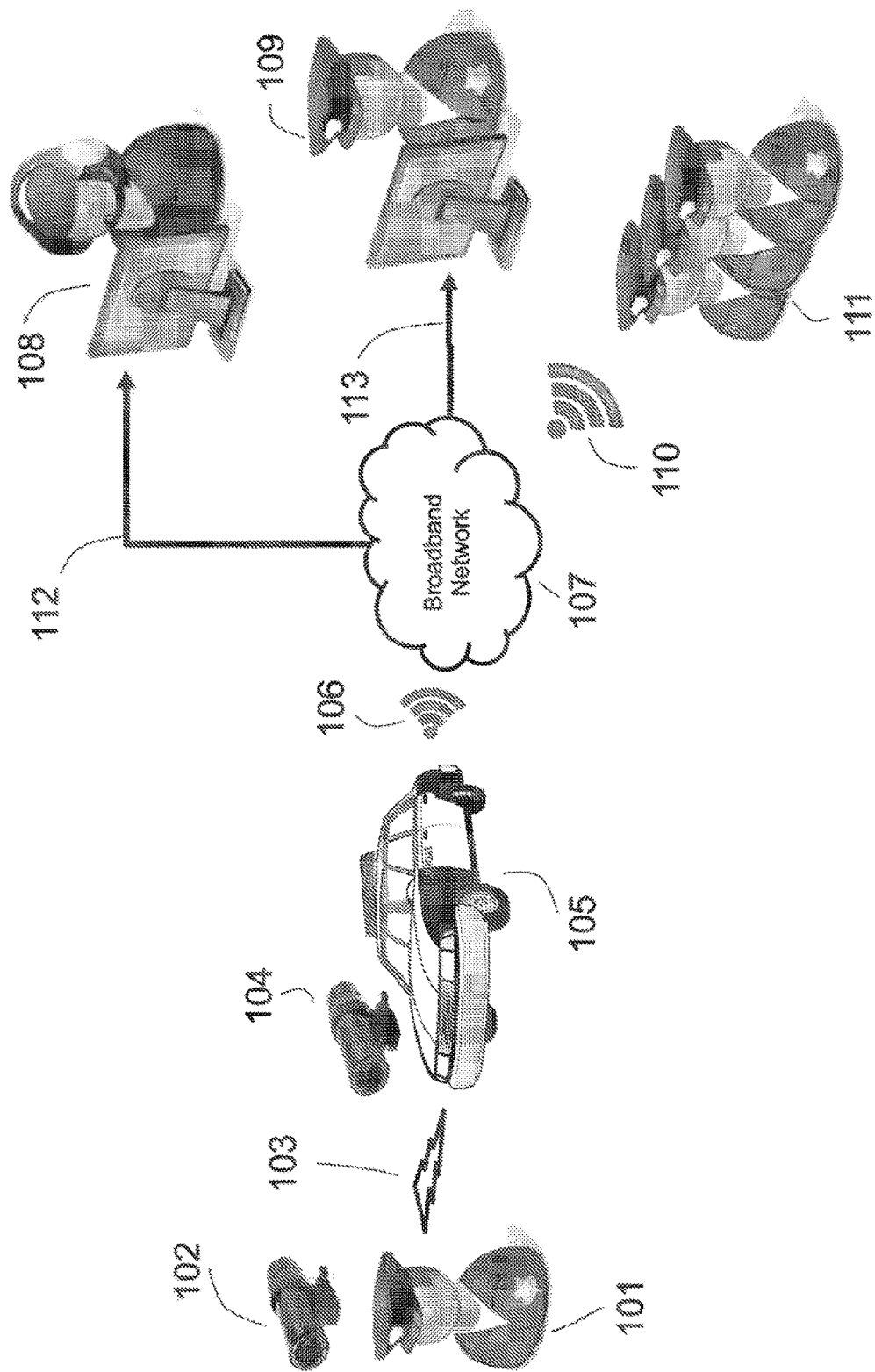
FIG. 1 shows an embodiment where sensor data is captured by sensors mounted on a vehicle or on the person of a field officer and transmitted from the remote vehicle via a broadband network to a central location or other parties available on a network.

Various example embodiments will be described more fully hereinafter with reference to the accompanying drawings, in which some example embodiments are shown. The present invention may, however, be embodied in many different forms and should not be construed as limited to the example embodiments set forth herein. These example embodiments are just that—examples—and many implementations and variations are possible that do not require the details provided herein. It should also be emphasized that the disclosure provides details of alternative examples, but such listing of alternatives is not exhaustive. Furthermore, any consistency of detail between various examples should not be interpreted as requiring such detail—it is impracticable to list every possible variation for every feature described herein. The language of the claims should be referenced in determining the requirements of the invention. In the drawings, the size and relative sizes of layers and regions may be exaggerated for clarity. Like numbers refer to like elements throughout.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises," "comprising," "includes," "including," "have," "having," etc., when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It will be understood that when an element or layer is referred to as being "on", "connected to", "coupled to", "adjacent to" or "communicating with" another element, it can be directly on, connected, coupled, adjacent or communicating to the other element, or intervening elements may be present. In contrast, when an element is referred to as being "directly on," "directly connected to", "directly coupled to", "immediately adjacent to" or "directly communicating with" another element, there are no intervening elements or layers present.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and/or the present specification and will not be interpreted in an idealized or overly formal sense unless expressly so defined herein.

FIG. 1 depicts one example of the present invention. In this embodiment, a sensing device 102, that may be carried on the person of a field officer 101, can transmit real-time or recorded information back to the officer's vehicle (block 105) via a wireless communication link 103 such as Bluetooth, infrared (IR) communications, microwave communications, GPRS, local WiFi (802.11x) radio, serial radio, 3G (WCDMA, CDMA 2000 EV-DO, TD-SCDMA), WiMax, 4G, or other types of wireless connections. Alternatively, the sensing device could upload recorded information to an in-vehicle system by a physical communication channel such as RS232, RS422, USB 1.0, USB 2.0, Firewire, analog RCA or Coax, or any other data communication means known in the art.

The sensing device 102 may comprise one or more of a video sensor, a still image sensor, an infra-red sensor, a thermal image sensor, a microphone or other audio capture device, a utility belt status sensor to sense the status of a utility belt or instruments associated with the utility belt, such as whether a gun, Taser, pepper spray or other weapon has been unholstered, a weapons sensor sensing if a gun, Taser, pepper spray or other weapon has had a respective safety device released, or if the weapon has been discharged, a heart rate monitor to monitor the heart rate of the field officer 101, a stress sensor providing stress indicator data (e.g., pupil dilation, accelerated breathing, and/or adrenaline) sensed from field officer 101, a running sensor (e.g., an accelerometer) to determine if the officer 101 is running, and/or a sensor to determine if the officer is lying down or otherwise not in a vertical position. The sensing device may comprise a button or other trigger mechanism which may be self actuated by the field officer 101. Sensing device 102 may additionally have a means for capturing, tagging or transmitting meta-data information such as, global positioning or GPS data, GIS or location data, date and time data. The sensing device 102 may also have the ability to analyze the video, image and/or audio it captures and transmit such analysis via communication link 103 alone or with other sensing device 102 data, such as by attaching the analysis as metadata to a transmitted video, image and/or audio.

Additionally, sensors 104 mounted in or on the vehicle (block 105) may also generate information. These sensors may include one or more of the sensors noted above with respect to sensing device 102, such as video or still image sensors, thermal or IR image sensors, global positioning or GPS sensors, GIS location information devices. Sensors 104 may also include (alternatively or in addition) flashing light status sensors, siren status sensors, door lock/unlock sensors, door open/close sensors, or seat occupancy sensors. These sensors may also include remote portable sensors such as temporarily deployable video sensors that may be set up to support a particular operation or action (e.g. setting up a temporary public safety perimeter around a public event such as a music concert).

Sensor data may also include data provided by analysis of video or still images taken from a camera mounted on the vehicle 104 or carried by the officer 101 (e.g., mounted on a helmet or gun of the officer 101). For example, by analyzing video images, the sensor data may include a "gun withdrawn" data (which may be a gun of the officer or gun of an unidentified third party) or "officer prone" when detecting the lying down of an officer. Sensor data may also include license plate number (including alphanumeric license plate numbers) to compare against a database, which may then be used as a basis for a rule (described later).

This embodiment of the present invention includes wireless communication links 106, 110, a broadband network 107, and wired communications links 112, and 113. Communication links 106, 110, 112 and 113 are exemplary and each may include combinations of wireless and wired communication links, or fully consist of wired or wireless communication links. Each of the communication links 106, 110, 112 and 113 are illustrated and described as a single link, but may comprise multiple separate links (e.g., such as one communication link 110 for each of plural remote mobile officers 111). Communication links 106 and 110 that are fully or partially wireless may promote the mobility of field officer 101. FIG. 1 also shows a dispatch service (with dispatch personnel) 108, a commander 109 (such as a precinct commander or shift commander), and additional remote field officers 111. Each (or multiple groups) of the additional remote field officers may be equipped with their own sensing device(s) 102, sensor(s) 104, and/or vehicle 105, (with corresponding separate communication links 103 if implemented). Throughout this disclosure, exemplary details regarding remote officer 101, devices associated with remote officer 101 (such as sensing device(s) 102, communication link 103, sensor(s) 104, vehicle 105, communication link 106) and the operation of such devices may be equally applicable to additional remote field officers 111. Similarly, exemplary details regarding remote officers 111, devices associated with remote officers 111 and their operation may be equally applicable to remote officer 101. The broadband network (block 107) may be any suitable communications network, such as public mobile phone networks, wireless LAN networks, wide area networks (WANs) and metropolitan area networks (MANs), and/or networks owned and operated by a single organization. Recently, the NTIA and FCC have allocated a 10 MHz block of wireless bandwidth in the D-Block of the radio frequency spectrum (700-800 MHz) for use by public safety users. This block is adjacent to a 10 MHz block already allocated for public safety use, creating a 20 MHz contiguous frequency block residing between 763 and 793 MHz that will be the basis for a new broadband public safety wireless network known as FirstNet. This network may use Long Term Evolution (LTE or more commonly 4G) technology to create a dedicated nationwide broadband network for public safety users and may be capable of real-time media streaming and transmission using standard network streaming techniques and protocols. The broadband network 107 may have one or more of these noted characteristics of the FirstNet system or include the FirstNet system. The wireless communication link 106 may be implemented by (or part of) the broadband network 107. Communication links 103, 106, 107, 110, 112 and 113 and broadband network 107 may form elements of a communication network, allowing data (such as sensor data), commands, requests to be transmitted between users such as field officers 101, 111, dispatch personnel 108 and commanders 109. For example, real-time or recorded sensor information of sensing device(s) 102 and sensors 104 (that may include rich media) may be transmitted with the communications network (via a broadband wireless network 107) to a remote location, such as to one or more of dispatch personnel 108, commander(s) 109 and other mobile field officers 111. Dispatch personnel 108 and/or commander(s) 109 may react to such information and send commands via the communication network to other remote field officers 111 in this embodiment and the other embodiments described herein, establishing communications and the communications themselves between field officers 101, 111 may be through the broadband network 107 or may be made point to point directly between officers (or using some other communication network). Point to point communications that do not use the broadband network 107 may avoid unnecessary congestion of communication traffic over the broadband network 107. Use of point to point communications between field officers may be in addition to the use of the broadband network, which may be used to provide information to a central station (e.g., to commander 109 or dispatch 108) and/or establish and provide communications between field officers that may be too far away from each other for effective point to point communications. Exemplary details of such communications are described elsewhere herein.

Sensor data of sensing device(s) 102 and/or sensors 104, which may include rich media, may be transmitted over broadband network 107 using standard internet protocols such as HTML, Secure HTML, Encrypted HTML, XML, Flash, REST, SOAP and/or using proprietary protocols that may be more suitable to public safety applications. Furthermore, rich media from the field officer or his vehicle (101 and 105) can be disseminated to one or more different locations. For example, employing TCP/IP, multiple sockets can be opened between the officer 101 or the officer's vehicle 105 and several receivers such as a dispatch service 108, a commander 109 (e.g., shift commander or precinct commander) or fellow remote field officers 111 via their own wireless communications equipment. Alternatively, using UDP/IP, communications (e.g., sensor data, rich media data, etc.) can be broadcast and received by multiple listeners such as by dispatch personnel 108, commander(s) 109 and/or other remote field officers 111.

Sensor data, such as audio, video, still images and rich media may be transmitted uncompressed or compressed using any compression schema, codec, and/or protocol including, but not limited to: QuickTime, AVI, Flash, MPEG 1, MPEG 2, MPEG 4, H.263, MJPEG, MJPEG200 and associated audio formats such as: WAV, MP3, AIFF, H.261 and so on.

Figure 2:
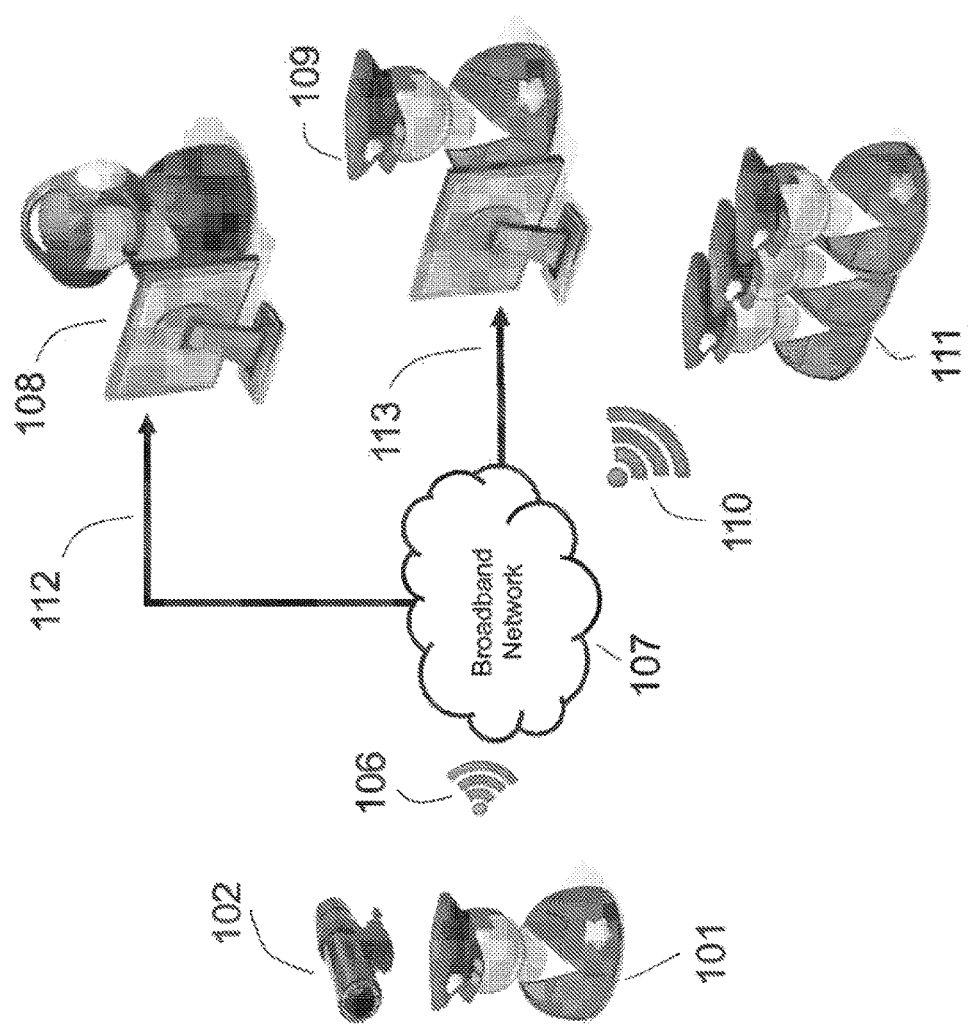
FIG. 2 shows an embodiment of the present invention whereby sensor data is captured and transmitted by a wirelessly enabled device on the person of a field officer.

FIG. 2 illustrates a second embodiment of the present invention. Like numerals within all figures, such as FIGS. 1 and 2, represent like elements. As shown in FIG. 2, the remote officer 101 may have sensing devices on his/her person that generate sensor data, such as rich media. Again, the sensing device 102 may be a video or still image sensor, an infra-red or thermal image sensor. It may have a microphone or other audio capture device. Alternatively or in addition, it may include a means for capturing, and transmitting other types of sensor data such as, but not limited to, global positioning or GPS data, GIS or location data, date and time data, utility belt status data such as whether a weapon, Taser, or pepper spray have been unholstered, or have had the safety devices released, or have been discharged. Such sensor data may be tagged to rich media such as video, still images, and/or audio as meta-data or may be transmitted separately. This sensing device 102 may also include a network of one or more remote portable sensors such as temporarily deployable video sensors that may be set up to support a particular operation or action (e.g. setting up a temporary public safety perimeter around a public event such as a music concert). An exemplary sensor is a speed sensor (which may be in communication with a vehicle's speedometer and/or GPS sensor) to provide the speed of a vehicle. The speed sensor data may include sensor data indicating when the speed of a vehicle is excessive (such as when the speed of the vehicle is higher than a certain value, such as higher than 75 mph, or higher than a certain amount over a speed limit as determined by location information provided by a GPS sensor—e.g., over 50 mph in a 35 mph zone). The speed sensor may be used to provide sensor data indicating the vehicle has stopped. Another exemplary sensor may comprise an accelerometer that may detect when an excessive deceleration of a vehicle indicates a crash or aggressive driving. Sensor data may include the detection of the deployment of airbags. For example, the sensor may be an accelerometer of the car to which the deployment of airbags is responsive.

The officer 101 may carry a mobile transmission device to transmit sensor data via communication link 106 through the broadband network 107 to the desired destination. The mobile transmission device may be a mobile phone, tablet, PDA, or other custom or proprietary mobile device with a wireless transceiver capable of communicating directly with a broadband wireless network 107 via wireless communication link 106. The broadband network 107 may be the FirstNet system based on the D-Block bandwidth allocated to public safety use by the NTIA and the FCC, for example.

Sensor data may be transmitted over broadband network 107 and may use standard internet methods and protocols such as HTML, Secure HTML, Encrypted HTML, XML, Flash, REST, SOAP. However, the invention does not preclude the use of a proprietary protocol that may be more suitable to public safety applications. Rich media from the field officer or his vehicle 101, (and 105 in FIG. 1) may be disseminated to one or more different locations. For example, employing TCP/IP, multiple sockets can be opened between the officer 101 or the officer's vehicle 105 and several receivers such as a dispatch service 108, a shift commander or precinct commander 109 or fellow remote field officers 111 via their own wireless communications equipment 110. Alternatively, using UDP/IP, rich media data can be broadcast and received by multiple listeners such as dispatch 108, shift or precinct commanders 109 and/or other remote field officers 111.

Sensor data, such as audio and video, may be transmitted uncompressed or compressed using any compression schema, codec, and/or protocol including, but not limited to: QuickTime, AVI, Flash. MPEG 1, MPEG 2, MPEG 4, H.263, MJPEG, MJPEG200 and associated audio formats such as: WAV, MP3, AIFF, H.261 and so on.

Figure 3:
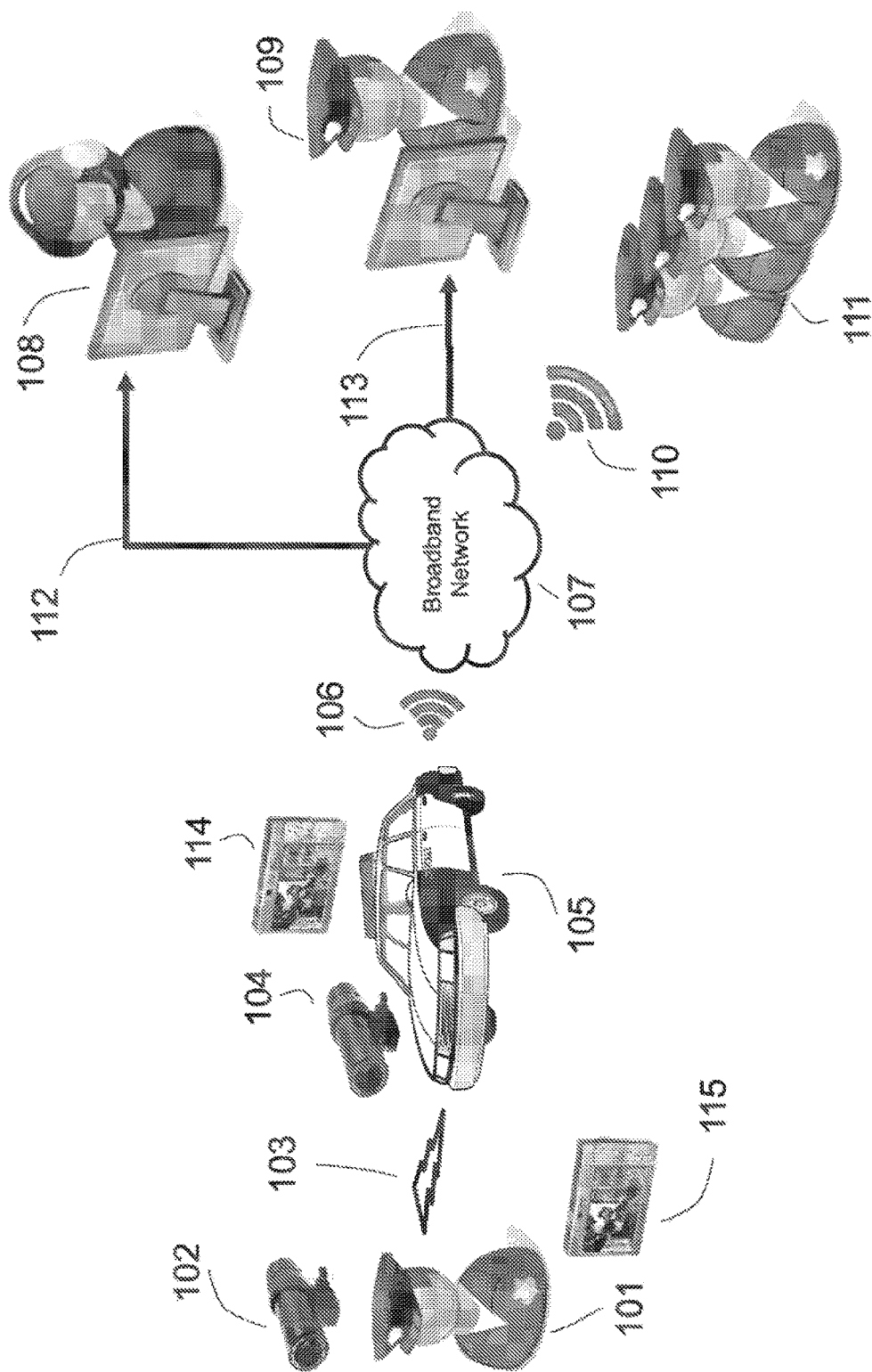
FIG. 3 illustrates how remotely captured sensor data can be streamed via a broadband network to a field officer who can store it locally or view it on a mobile device mounted in his/her vehicle or carried on his/her person.

Live or recorded rich media or other sensor data may be streamed in real-time or after the fact to other remote field officers 111. FIG. 3 illustrates an exemplary process. Rich media or other sensor data described herein is acquired by remote mobile officers 111 with sensors on their person or in their vehicles. This information is sent over the broadband network 107 from a wireless transceiver via a communication link 110. Again, the system may use of all of the same types of data and data transmission protocols as discussed elsewhere herein. In this example, the information is sent via the broadband wireless network 107 to a specific remote field officer 101. The information is received via wireless communication link 106 by a mobile communications system 114 mounted in the remote officer's vehicle 105 or by a mobile device 115 such as a phone, tablet, PDA, or other wireless device being carried by the officer 101. Alternatively, the information could be received by a device 114 mounted in the officer's vehicle 105 and then transmitted locally to a display device 115 carried by the officer 101. The transmission may be accomplished via a local wireless communication channel 103 employing some wireless communication means as Bluetooth, IR communications, microwave communications, GPRS, local WiFi (802.11x) radio, serial radio, 3G (WCDMA, CDMA 2000 EV-DO, TD-SCDMA), WiMax, 4G, or other type of wireless connection.

There are a number of different ways the decision may be made to route the rich media or other sensor data to the remote field officer 111. In one embodiment, a rule-based system is collocated with a remote officer 111. The system may reside on a mobile device on-board the officer's vehicle 105 or on the person of the officer 111. The rule-based system may contain a rule that specifies under which circumstances certain information should be transmitted via the broadband wireless network 107 and to where such information should be transmitted, such as to a particular one or more of the remote field officers 101 and/or 111, the commander 109 and/or dispatch personnel 108. Alternatively, in another embodiment, the sensor data, such as rich media, may be transmitted from a remote officer 111 to a central location such as a dispatch office 108 or a commander 109 (e.g., a shift commander or precinct commander). Authorized personnel at the central location (108 and/or 109) may decide that the remote field officer 101 should receive the sensor data information, such as by streaming the received video, or transmitting still images, or transmitting text regarding a detected event derived from the sensor data. Such information may be routed directly to the remote officer 101 via the broadband network 107. In yet another embodiment, a rule-based system may resides at the central location (e.g., 108 or 109) that receives sensor data (or processed sensor data) from one or more of the officers 111 and 101 that employs a rule that specifies under which conditions the information should be automatically routed to another of the remote field officers, such as field officers 111.

Users of the system may control what information is transmitted to which other users. A rule-based expert system may be used to control data flow. This system is described in more detail during the discussion of FIGS. 4 though 9.

Figure 4:
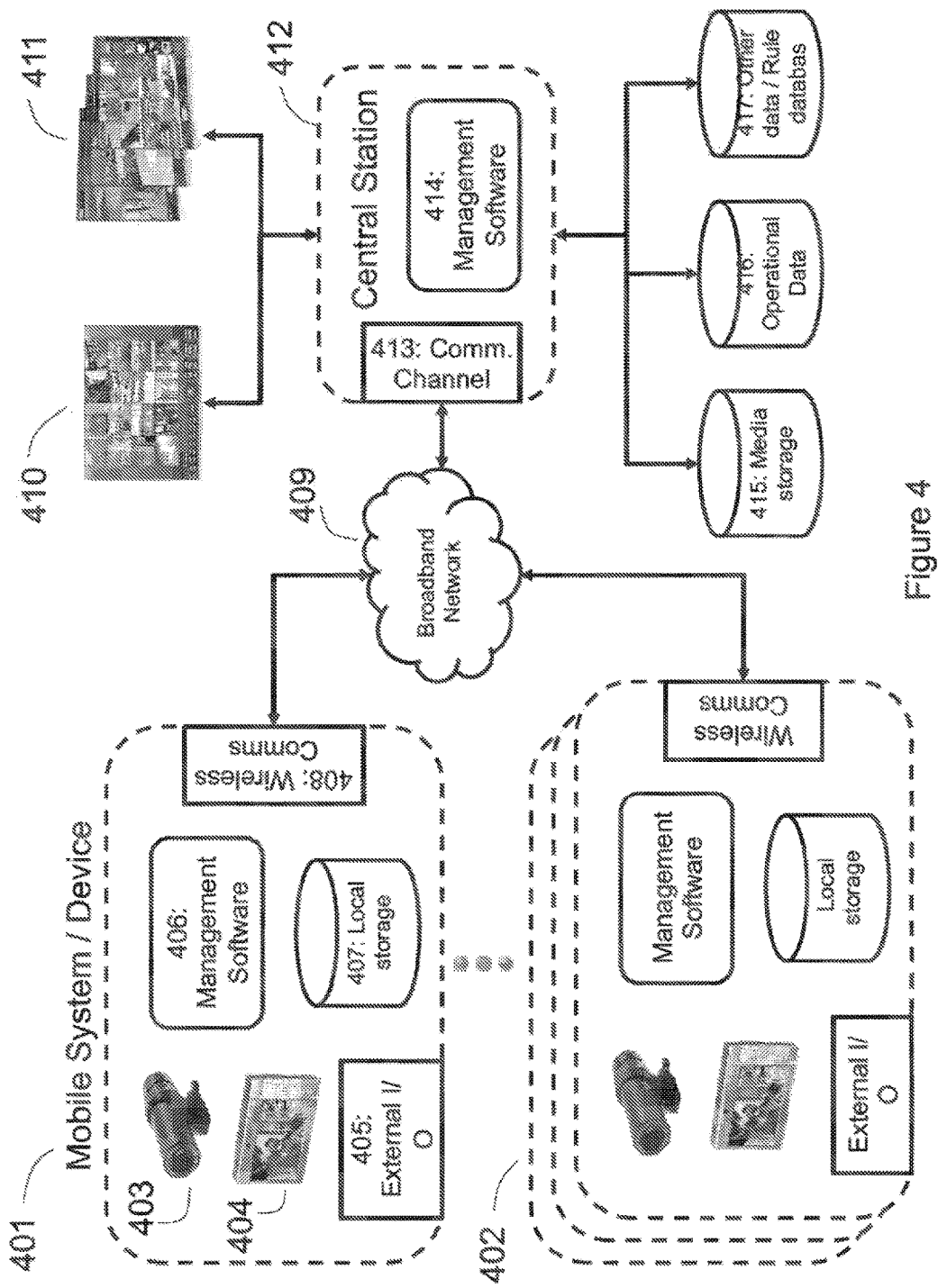
FIG. 4 shows a high level architecture of an exemplary system according to one embodiment.

FIG. 4 shows system architecture of one embodiment comprising a mobile system/mobile device 401 that is in the possession of one or more remote field officers. This mobile system or device 401 could be mounted in a vehicle, carried by the field officer, or may be a distributed system with elements located with the field officer and his/her vehicle. The mobile system/device 401 may comprise a computer or computing platform (e.g., a computer comprising a processor, memory for data and programming, etc.) that may form elements of a portable mobile device such as a smart phone, PDA, tablet, or other portable computing platform such as a laptop or vehicle-mounted computer. The mobile system/device 401 comprises one or more sensors 403, a display and/or user interface 404, a suite of management software (block 406), a wireless broadband communications system (block 408), and local data storage 407, and an external input/output (I/O) interface 405. The computer of the mobile system 401 may be comprised of elements of the mobile system/device 401, such as local storage 407 (e.g., volatile memory and/or non-volatile memory storing software comprising management software 406), the external input/outputs 405, wireless communication block 408, and a processor used to control and access the same to implement the methods described herein.

The sensor(s) 403 may be the same as those of sensing device 102 and/or sensors 104 discussed herein, and may include audio and/or video sensors, still imagery sensors, infrared, or thermal imagery sensors. They may be mounted either in the vehicle or carried on the person of the field officer. They may also be directly integrated into the computing platform of the mobile system or device 401. For example, sensor(s) 403 may comprise a video camera integrated into a smart phone or PDA. The sensors 403 may be separated from the computing platform and may communicate by a wired or wireless communication means.

The display and/or user interface 404 may be used to view live sensor data (e.g. video and audio), review locally recorded sensor data, view sensor data streamed to the device from other sources via the broadband wireless network 409, and to configure and control the mobile system/device. The interface 404 comprises a display screen and an input device such as a touch screen, keyboard, mouse, trackball, track-pad, or other such mechanism. The input device may comprise a microphone and voice recognition circuitry (such as a software programmed computer, firmware, hardware, etc.) to receive and interpret commands of the user (e.g., a remote field officer 101, 111) allowing hands free control (such as issuing one or more commands of the mobile system/device 401). The input device may comprise a motion detector and motion interpretation circuitry (such as a software programmed computer, firmware, hardware, etc.) to detect motion of the user and interpret such motion to control (such as issuing one or more commands) the mobile system/device 401. The user may thus issue commands without requiring holding or manipulating the mobile system/device 401. Voice activated commands may include commands to accept a communication (e.g., to allow display of video or still images), to request back up, to notify others of a particular situation (e.g., "burglary in progress"), and such commands may be associated with the automatic transmission of sensor data as described elsewhere herein. Motion activated commands may include simple quick gestures. For example waving a hand, such as across a display of interface 404 of the mobile system/device 401 may be interpreted as a command to accept a communication request and/or display video or still images, or to initiate a communication to transmit of sensor data as described elsewhere herein. The display may be integrated into the computing platform (i.e. the screen of a smart phone, PDA, tablet, or laptop) or may be a separate device connected to the computing platform via a wired or wireless communication means.

The management software 406 controls the device or system and runs on a processor within the computing platform. Management software (block 406) may be implemented by conventional computer software stored in local storage 407, firmware, or by a specialty processing device such as an FPGA, ASIC, or other custom hardware.

The wireless communications sub-system (block 408) manages communications between the system or device and the broadband wireless network 409. Wireless communication block 408 may comprise a wireless communication chipset separate from the processor of the computer or may be formed as a functional block using the processor of the computer and software. Wireless communication block 408 may comprise a wireless radio and transceiver configured to communicate with the broadband network 409 using the appropriate wireless protocols such as Bluetooth, IR communications, microwave communications, GPRS, local WiFi (802.11x) radio, serial radio, 3G (WCDMA, CDMA 2000 EV-DO, TD-SCDMA), WiMax, 4G. In one specific embodiment, it could use the LTE wireless protocols of the FirstNet system employing the D-Block bandwidth specified for public safety use.

The optional local storage 407 may be used to store and review rich media and other sensor data and may be integrated with the processing device or may be a separate storage unit. It may consist of magnetic, optical, or solid state storage media, or any other data storage mechanism. The storage device may also be used as the source of rich media information that could be viewed by the officer or transmitted by the system to one or more remote users.

The external I/O interface 405 is used to integrate the mobile device or system with other systems or subsystems within the environment of the remote field officer or his/her vehicle. These external systems can be used as triggers to control the capture, storage, transmission, and management of the rich media from the sensors 403. They may also receive data that can be used as meta-data that may be tagged to sensor data received from sensors 403. For example, time and/or location data received via external I/O interface via a universal clock or GPS system may be tagged to video or images obtained from sensors 403 as meta-data. Examples of other systems that may be integrated include, but are not limited to, universal date/time systems, global positioning (GPS) systems, GIS databases, vehicle management systems such as speed detection systems, emergency lights, emergency sirens, vehicle door systems, weapon handling systems, operational or case-specific data repositories, or any other systems that may be able to provide data to a public safety field officer. Information of these systems and/or of sensors 403 may be provided via external I/O interface 405 or other interfaces within the mobile system/device 401.

Information captured or stored by the mobile system or device 401 may be transmitted via a broadband wireless network 409 to a central management station 412 or directly or indirectly to other systems such as other mobile systems/devices 402 (which may have the same structure described herein with respect to mobile system/device 401) or other display consoles 411. The management software (block 406) may be responsible for determining when rich media or other sensor data is stored or transferred over the broadband network 409, and to which end-user. The management software may use a rules-based engine to make those determinations. The rules engine, or one of the users of the mobile system/device 401, 402, may determine that multiple recipients should receive sensor data. For example, a rule could determine that under certain conditions, rich media data (such as video or images) is automatically sent to a central station. A rule implemented by the management software 406 may determine that under certain circumstances, rich media or other sensor data should be sent to other first responders. The rules may determine which specific first responders should get access to the data. For example, first responders within a certain geographic region (e.g. within two miles of the data source) may be selected as recipients of the rich media or other sensor data. The rules may determine that only responders or recipients of certain rank may get the rich media data or other sensor data. For example, upon detection of certain events, a shift commander may be selected to receive all of the data; a remote squad leader may be selected get text alerts and video; and other local field officers may be selected to receive just alert information without the rich media accompaniments.

Furthermore, each mobile system/device 401, 402 may be configured to create multiple different sets of data and simultaneously (or in succession) transmit the data to multiple recipients (or storage devices). For example different versions of the sensor data obtained from the same event may be sent to different groups of recipients. For example, a shift commander may receive live video streamed from the originating officer while other field officers (local to the originating officer) may only receive audio or text alerts. The types of events detected by mobile system/device 401, 402 may determine the recipients of particular sensor data of sensors 403. For example, detection of a stopped vehicle event may cause transmission of a stopped vehicle alert with certain associated sensor data (e.g., video) to be sent to a shift commander; in contrast, detection of an unholstered gun event may cause transmission of an unholstered gun alert with certain associated sensor data to all personnel within a certain geographical distance. As alternative to geographical distance, in this embodiment and other disclosed embodiments herein, a calculation of an estimated arrival time may be used based on road map information and estimated speeds.

The recipients may be part of the same service or agency—or may be from different government (or other civil) agencies. For example, routine police events may trigger the system to send information to other members of the same agency (e.g., the police department) (or to the same precinct within the police department); but detection of weapon-based events or detection of vehicle crash events may automatically cause messages, data, rich media, and/or other information to be sent to other agencies such as EMT's, Paramedics, local law enforcement, state law enforcement, federal law enforcement (e.g., FBI), local Fire and Rescue units, and/or military units. Sensor data may be transmitted to recipients of a different agency of the transmitting field officer by selection by the transmitting field officer or by the central station (e.g. commanders or dispatch). For example, it may be determined that a car chase is likely heading to a district boundary of a neighboring police district. The chasing officer or personnel of the central station may select an option on the mobile system/device 401 to transmit sensor data and/or establish communications with neighboring field officers and/or the central station of the neighboring police district. As another example, a police officer may recognize the need to involve the fire department and/or medical services and may select an option on the mobile system/device 401 to transmit sensor data and/or establish communications with the local fire department and/or emergency medical teams. As another example, during the fighting of a wildfire, the wind direction may change and threaten other districts. A fire fighter field officer may select an option on the mobile system/device 401 to transmit sensor data and/or establish communications with a fire department of a neighboring district.

The central station 412 may be used as a central storage repository for received sensor data from mobile system/devices 401, 402 and a command and control center. A precinct commander or shift commander or other authorized personnel may manage, view, store, and disseminate sensor data such as rich media received from each of the mobile systems/devices 401, 402. The central station system 412 may allow a shift commander or precinct commander to configure, or if necessary, override the functionality of each of the mobile systems/devices 401, 402. For example, a field officer may configure a remote mobile system/device 401, 402 to record video without transmission whenever he or she turns on the emergency flashing lights in his/her vehicle. The shift commander or precinct commander may override that rule and have the mobile system/device 401, 402 both record and transmit video whenever the emergency flashing lights are turned on.

To that end, the central station system 412 includes management software (block 414) configured to allow a user to view, store, manage, and transmit received sensor data, such as rich media. It also may have functionality that allows a user to configure one or more mobile devices or systems (block 401 and 402). The Management software may be implemented by conventional computer software, firmware, or a specialty processor such as an FPGA, ASIC, or other custom hardware. And the software may reside on a conventional PC or server, a laptop, a tablet, smart phone, PDA, or any other computing device.

The central station 412 may also include a communication channel (block 413) that allows it to receive and transmit data from and to the wireless broadband network (block 409). This component may be a wireless radio and transceiver capable of communicating with the broadband network (block 409) using the appropriate wireless protocols such as Bluetooth, IR communications, microwave communications, GPRS, local WiFi (802.11x) radio, serial radio, 3G (WCDMA, CDMA 2000 EV-DO, TD-SCDMA), WiMax, 4G. In one specific embodiment, it may use the LTE wireless protocols of the FirstNet system employing the D-Block bandwidth specified for public safety use by NTIA and the FCC.

The central station 412 may also be connect to a number of data stores 415, 416, and 417 for storage, retrieval and management of sensor data, such as rich media, (storage 415), operational data (storage 416), and other pertinent data (storage 417) such as rules for applying to sensor data for event detection and information distribution to others connected to the broadband network 409. Rich media stored in storage 415 may include audio and video sensor data with associated meta-data tags. Operational data stored in storage 416 may include such information as shift details, officer profiles, HR information, and other types of operational information. Data stored in storage 417 may include information criminal statistics or demographic information, GIS information, or other secondary information. These data stores 415, 416 and 417 may be regular data bases or other types of information storage and may comprise standard magnetic, optical, and/or solid state storage memory.

Additionally, the central station may include a user interface 410 so that a user may view, store, manage, and/or transmit sensor data, including rich media and associated information. The user interface may include one or more displays for displaying event detection alerts, video and/or still image sensor data. The user interface may include a data input device, such as a keyboard, mouse, trackpad, etc. to configure the system and control one or more mobile systems/devices 401, 402.

The central station system may support one or more visualization clients (e.g., one or more displays for simultaneously displaying sensor video and/or image data from one or more of mobile systems/devices 401, 402) 411 so that other users such as dispatch, trainees, or other investigators can view rich media and other sensor information from the mobile devices or systems.

Figure 5:
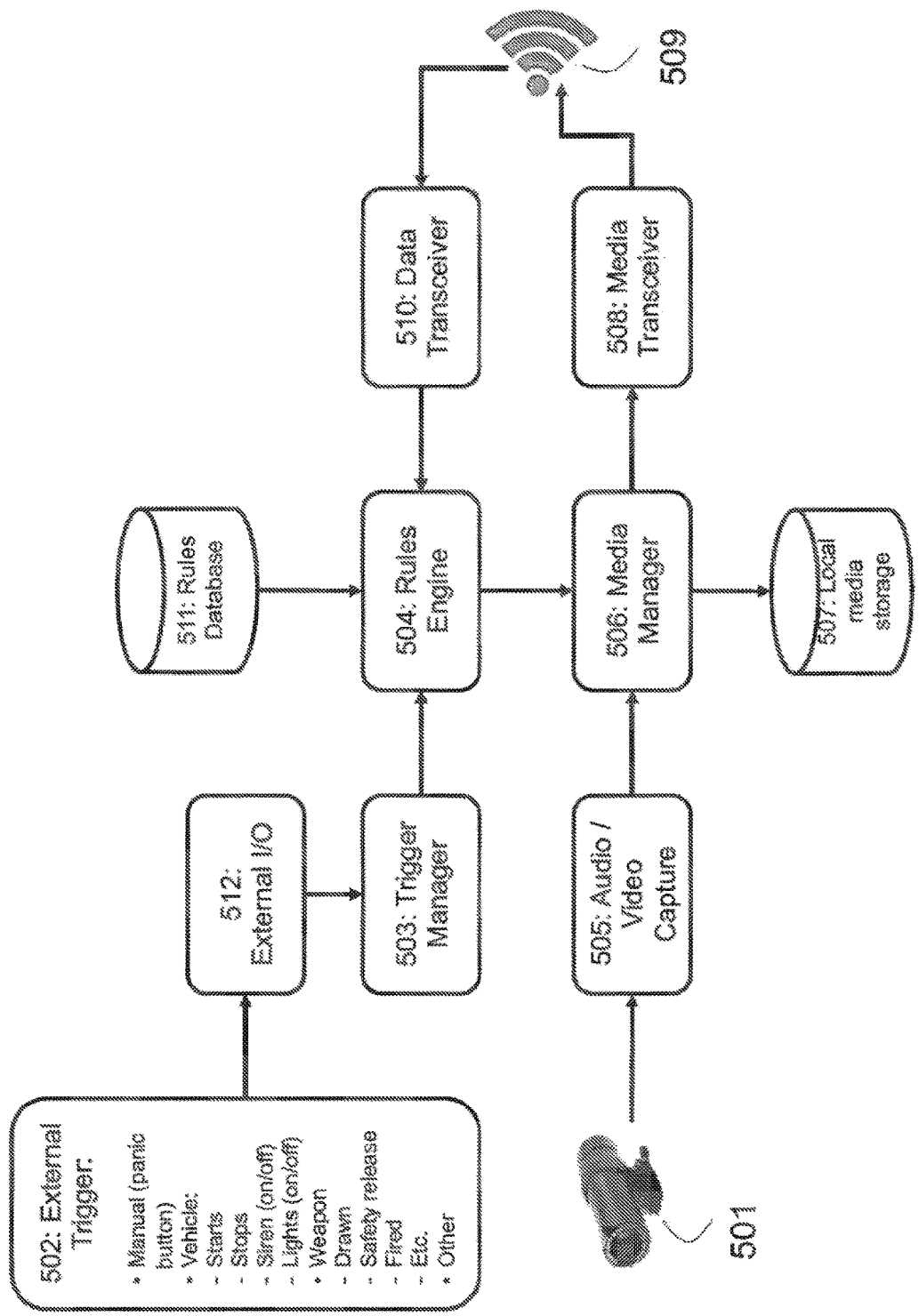
FIG. 5 shows an exemplary configuration of a mobile system/device.

FIG. 5 illustrates details of an exemplary mobile system/device 401, 402. The elements of FIG. 5 may be implemented with the structure described with respect to FIG. 4, such as the various sensors, computers, processors, etc. described herein. For example, block 502 may comprise one or more of the sensors describe herein to provide sensor data, sensor 501 may comprise a video or still camera, communications channel 509 may constitute a communication link to the broadband network 409, and remaining elements of FIG. 5 may be formed of one or more general purpose computer or special purpose computers. A rich media sensor 501 produces a media signal (e.g., video or still images) that is received by a capture device 505 and converted into a digital media stream and stored in a local memory buffer of the capture device 505. Video media can be represented in any digital format such as raw video (RGB, YUV, or other) or n a compressed form such as QT, AVI, MPEG1, MPEG2, MPEG4, H.264, or MJPEG. Audio media can be represented in any digital format such as raw audio, WAV, MP3, AIFF, H.261 and so on. External triggers of block 502 may comprise meta data and/or event detection provided by analysis of the media signal (e.g., video and/or audio) produced by rich media sensor 501. Such analysis to provide this event detection may be performed by a computer separate from the mobile system/device 401, 402 (such as a processor part of rich media sensor 501) or may be performed by a computer forming the mobile system/device 401, 402 (such as by a processor forming rules engine 504).

The rich media is managed by a media manager component (block 506). The media manager 506 may be formed by a processor, and may be a separate processor or the same processor as that of the rules engine 504. The media manager 506 routes the media to one or more locations based on input from the rules engine (block 504). Media manager 506 may determine to ignore sensor data, store all or some of the sensor data on a local storage device (block 507) or automatically initiate transmission of all or selected portions (which may be selected based on rules) of the sensor data to one or more remote sites via the broadband wireless network 409. Local media storage 507 may be a memory of a computer which forms the mobile system/device 401, 402. The media manager 506 may maintain the local memory buffer so that there is always several seconds of stored media available in the buffer if the system (or an external user) decides that a certain amount of media in the buffer (e.g., "pre-roll" media) should be stored or transmitted. The length of the local memory buffer may be configurable. Also note that there may be multiple buffers to store multiple channels of rich media if there are multiple sensors connected to the system. For example, there may be multiple vehicle-mounted video cameras and/or multiple video cameras mounted on the field officer's person or equipment, and each of the multiple buffers may be assigned to a video camera to buffer corresponding output video of that video camera.

The rules engine (block 504) may be comprise a processor which forms a digital logic engine that uses a standard rule-based approach to determine what to do with any particular segment of rich media that is available to the media manager (block 506). The rules engine, using standard logic, can decide whether media from a particular source at particular time should be ignored, stored locally, or transmitted to one or more remote locations. For example, the rules engine (block 504) can decide that all video from the vehicle mounted camera should be stored when the vehicle's lights are flashing or the siren is turned on. Or the rules engine (block 504) can decide that all video from the field officer's weapon should be transmitted to the shift commander any time the weapon has been unholstered. It is also possible that a remote user (such as a shift commander) can override the rules engine and require that, for example, all video from a vehicle-mounted camera should be transmitted to all local units. These are obviously just examples and there are many other potential rule scenarios available to any person of skill in the art.

The rules engine (block 504) may match a set of real-time triggers against a data-base (block 511) of pre-defined rules to determine if a particular rule condition has been met. The database 511 may be memory of a computer of the mobile system/device 401, 402. In some examples, the database may be downloaded from a remote central station. If the condition has been met, the rules engine (block 504) provides the media manager (block 506) with a pre-defined set of instructions for media management. Additionally, asynchronous commands can be fed to the rules engine (block 504) by the data transceiver (block 510) which interprets external commands from a shift commander or other authorized personnel at the central command station (412 of FIG. 4).

Rules can be set up for transmitting information based on a number of different conditions. The information that is transmitted may be any combination of video, still images, audio, text, or any other sensor or alert data. Any of the triggers described in block 502 (or elsewhere in this specification) may form the basis of a data transmission rule. The rules engine 504 may apply a rule may against the sensor data (including images, audio and other sensor data, such as from external triggers 502 or sensors 501) to determine a priority for a transmission or other communication. Priority for a transmission or other communication may also be based on a manual input. Priority for a transmission may be provided to media transceiver 508 to communicate the priority of an associated communication to the broadband network 409 via communication channel 509. The rules engine 504 may determine when, to whom, and what is transmitted. Media manager 506 may be responsive to the rules engine to establish communications accordingly. Priority for a transmission may also be used to communicate with the broadband network 409 to determine a communications priority with respect to other communications within the broadband network 409. For example, event detection by rules engine 504 based on analysis of sensor data from external triggers 502 and/or sensors 501 may result in a communications priority of 3 on a scale of 0 to 5. When performing subsequent related communications via broadband network 409, the broadband network may allocate bandwidth for such related communications, giving bandwidth and/or quality of service priority to such related communications over those communications with lesser priority (e.g., with priority 0-2). A rule may be devised so that the transmission of particular sensor data triggered by detection of certain events includes additional details including location, name, and rank of the originating officer—or the duty status (on-duty or off-duty) of the originating officer. A rule may store or transmit data based on location or time. For example: "only send data to receivers within a couple of miles of my current location"; or "only send data between a start time of my shift and an end time of my shift". Rules may also instruct the system when and how to store messages and data within the local storage media (block 507). Any or all of the previously described conditions and/or sensor data can be used to trigger transmission and which sensor data is transmitted in response to one or more rules applied to such sensor data.

Real-time sensor data may enter the system through the external I/O interface (block 512). This real time sensor data may act as external triggers (block 502) and may originate from many other systems in the environment of the field officer and his/her vehicle. For example, these sensor data triggers could be generated by vehicle systems (such as the vehicle starting, stopping, moving at a particular speed, turning the siren on or off, turning the emergency lights on or off); or systems on the officer's person such as weapon systems (unholstering a weapon, releasing a safety device, discharging a weapon, etc.), a heart monitor, or a panic button. Real-time sensor data triggers may be stored in a FIFO queue within a trigger manager (block 503) and then sent to the rules engine (block 504) for processing. The sensor data triggers from block 502 may also be stored in local media storage 507 or other storage, without transmission, for later analysis.

Rich media, such as video and still images, may be stored locally by recording it in the local media storage device (block 507). Media that should be transmitted to a remote location (e.g. based upon a detection of a certain event by rules engine 504) may be sent to the media transceiver (block 508) and encoded for transmission via the wireless communication channel (block 509) to the broadband network. Command and control or configuration information may be received from a remote location over the communication channel (block 509) and may be sent to a data transceiver (block 510) that decodes the command, control, or configuration information, and passes it to the rules engine (block 504) for processing.

Figure 6:
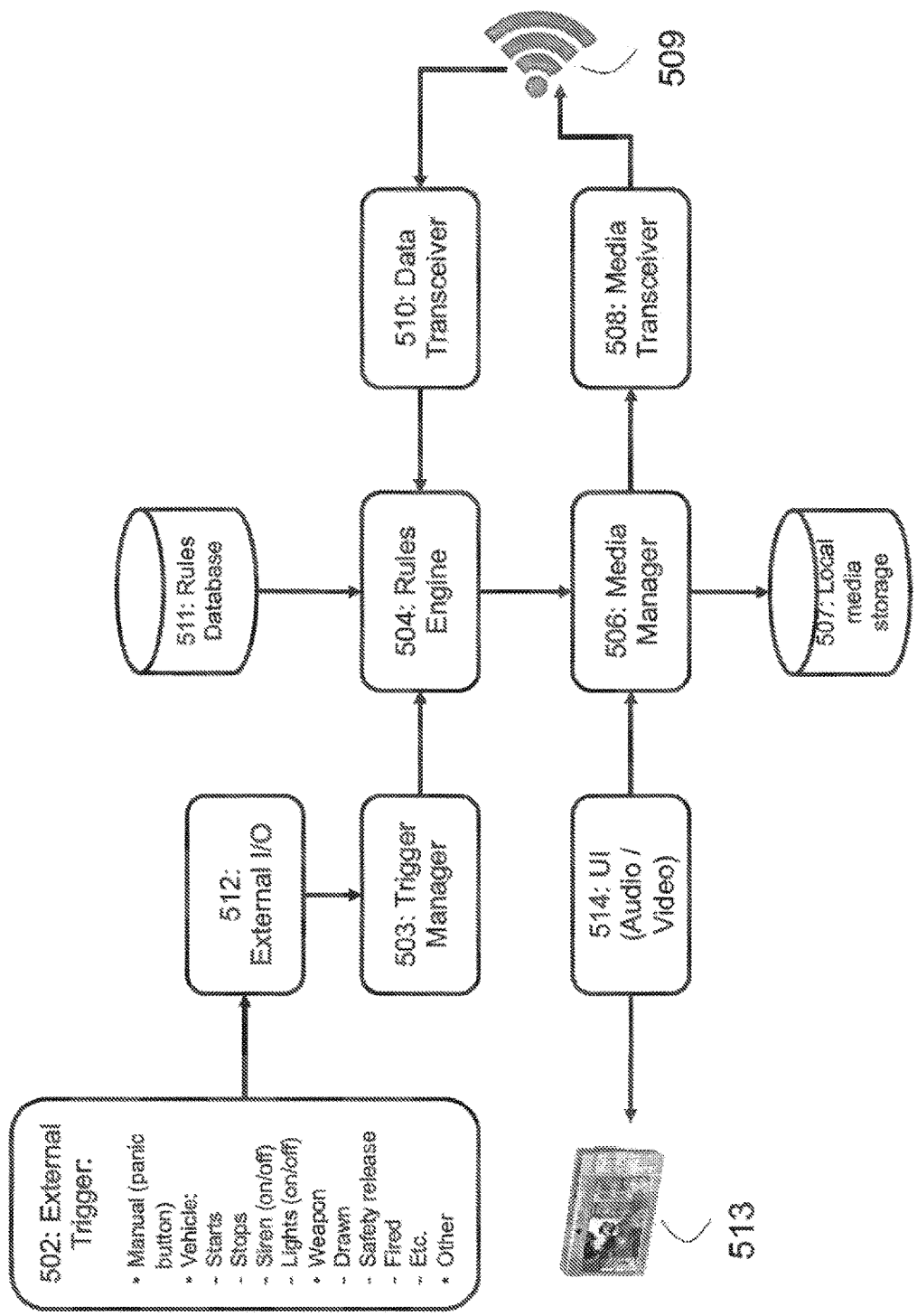
FIG. 6 shows how retransmitted rich media can be viewed by a field officer.

FIG. 6 illustrates how rich media information can be received and viewed by the mobile device or system 401, 402. In this example, a remote user, such as a central shift commander decides that certain rich media external to the mobile system/device 401, 402 should be transmitted to a field officer carrying mobile system/device 401 (or 402) for review or to help coordinate a particular action. In this case, encoded video and attendant meta-data may be received by the mobile system/device 401, 402 through the wireless communication channel (block 509). The media is decoded by the media transceiver (block 508) and any attendant meta-data is decoded by the data transceiver (block 509). The associated meta-data may include such information as GIS information, location or GPS information, additional case information, or simple system commands telling the system to alert the officer to review the accompanying media, which may include override instructions to interrupt (or make a lesser priority) other actions of the mobile system/device 401, 402 of FIG. 6.

The media manager (block 506) has access to the decoded rich media data and routes it appropriately based on input from the rules engine (block 504). The media manager may ignore the media, store it in the local media storage 507 for later review, or feed it directly to a user interface 514 so that an officer can view it on his or her user display 513 (which may be part of the user interface 514). The determination of handling the media by mobile system/device 401, 402 may be based upon settings within the mobile system/device 401, 402 and meta-data information associated with the received media. For example, the field officer may set the mobile system/device to ignore media having lower priority levels, store media for later review having medium priority levels, and immediately display media having higher priority levels. Additionally, the system may provide an alarm to the field officer to alert him or her that there is some media of interest available on the display 513. Certain priority levels may provide a visual and/or audio alert to the field officer to allow selection by the field officer (e.g., touch-screen activation by tapping the portion of the screen showing a visual alert) or otherwise perform a selection via user interface 514 to start display of the received rich media. User interface 514 may be integrated with display 513, sensors 501 (see FIG. 5) or a separate interface, in communication with media manager 506 and rules engine 504.

The system also allows a user to determining how an incoming message may be reported (or even if it is reported). The incoming message may be displayed as a text message on a screen in the vehicle or on the officer's person; an audio alarm; a "vibration" of a mobile device, a voice message; a still image or video image on a display screen (either picture-in-picture or a whole image). Once a message is accepted, the incoming rich media or other data can be displayed fully on the display 513 of the mobile system/device 401, 402. Rules can be set up in the rules engine (block 504) to manage incoming messages.

The rules engine (block 504) may be responsible for making the determination of how to route the incoming rich media based on the priority of the incoming control information from the data transceiver (block 510) balanced against the existing local environment as captured by information in the trigger management (block 503). For example, a shift commander may route some video to a field officer and suggest that the officer view it. However, the officer may have his or her weapon drawn with the safety device released and may be in a life-threatening situation. Under these conditions, the rules engine (block 504) may determine not to distract the field officer with external alarms or information and delay presentation of such alarms or information until a later time. Rules can be set up for receiving (or denying or delaying) incoming information based on a number of different conditions. Any of the triggers described in block 502 (or elsewhere in this specification) may form the basis of a data management rule. Or a rule may be based on the priority of the incoming message; or the rank of the originator of the message. Or a rule may be based on location or time. For example: "only show me data that is generated within a couple of miles of my current location"; or "show me data during my shift, but not after I've ended it" or "show me data of low to high priority during my shift, but only data of high priority outside my shift". These rules may control if and when incoming messages and data are displayed and/or accepted or rejected. Rules may also be created to instruct the system when and how to store incoming messages and data within the local storage media (block 507). Any or all of the previously described conditions can be used as the basis of rules to that can be applied to incoming messages and data to control local storage.

Figure 7:
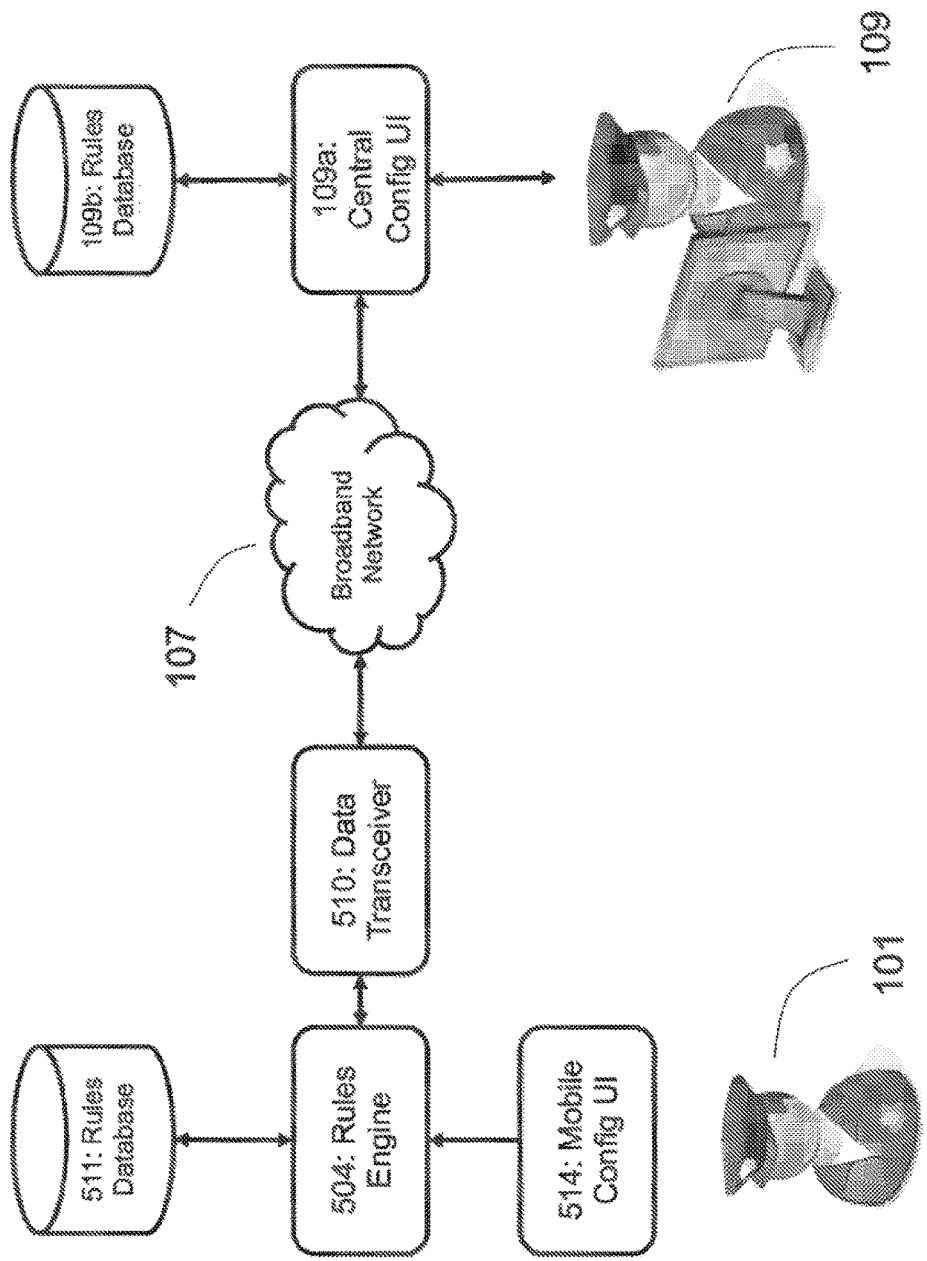
FIG. 7 illustrates local configuration by a field officer or remotely by a shift commander or other authorized personnel.

FIG. 7 shows how a field officer 101 or a shift commander or a centrally located operator 109 can configure the rich media system. The field officer 101 has access to a mobile configuration user interface 514 which is hosted on a local computing platform such as a mobile device, smart phone, PDA, tablet, or on a vehicle mounted system such as a laptop, tablet, or other custom computing platform.

The user 101 uses the mobile configuration user interface 514 to create a set of management rules that control the rules engine (block 504) at run-time. These rules may be previously created as sets of rules for selection by the user 101 and/or individually created. These rules may be stored for retrieval in the local rules database 511. After creation of additional rules or rule-sets, these may be stored in the local rules database 511 for later retrieval and use. Additionally, these user-defined rules may be encoded by an on-board data transceiver 510 and transmitted over the wireless broadband network 107 to a centrally located rules database 511 and personnel (e.g., a commander) at the central station 109.

A remote shift commander or a centrally located operator 109 may also configure the system. In one example, a shift commander 109 can create media management rules that may override a field officer's 101 rules. Such a rule might be that the shift commander 109 creates a rule for a particular officer 101 that instructs the system to transmit all video and audio from that officer's vehicle whenever the emergency lights or siren are switched on in that vehicle. This rule is sent asynchronously via the broadband network 107 to the rules engine 504 in the field officer's local system and is stored locally in the local rules database 511. In another example, a shift officer may create a central rule such as: whenever field officer #24601 is transmitting video and he has his weapon drawn, that video should be automatically retransmitted to all other officers within a selected distance (e.g., a one mile radius) of officer #24601. This rule may be interpreted by the management software (block 414) at the central station (block 412), and then video with commands to display video may be transmitted from the central station (block 412) to other mobile devices or systems (block 402) belonging to other field officers 111.

Figure 8:
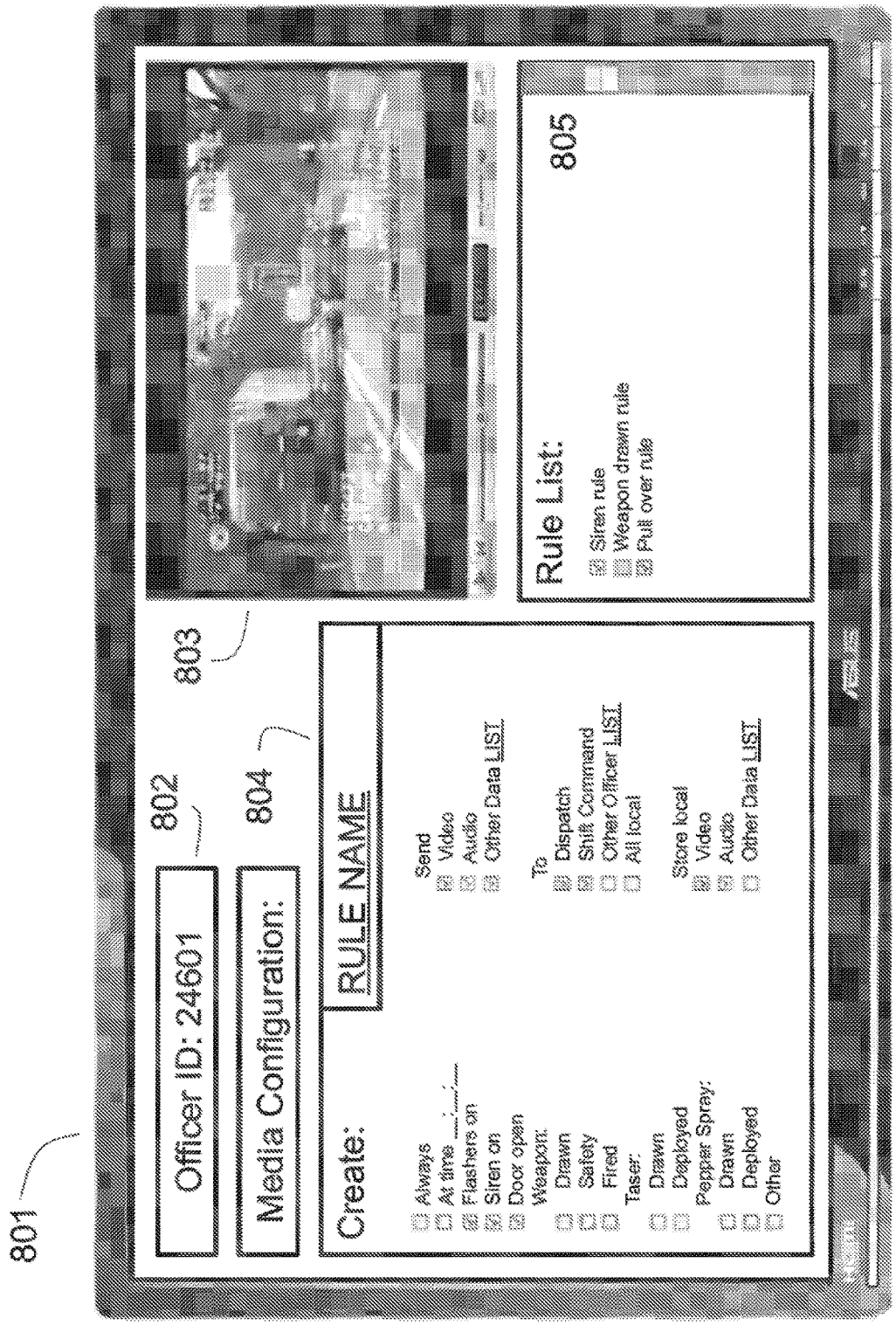
FIG. 8 shows an exemplary interface for a field officer to configure the system and create rules.

FIG. 8 shows an example of the configuration screen that a field officer may use for configuring the system. Information and rich media (e.g., video and/or still images 803) are displayed on a display portion of interface 801 that may be a touch screen; a screen of a portable device such as a smart phone, PDA, or tablet; a projected screen, such as a screen projected onto a portion of a windshield or a dashboard of the vehicle 105 of the remote officer or projected on another surface, such as a wall; a screen of eyeglasses worn by the remote officer 101, 111 (e.g., by projection or otherwise built into the eyeglasses so that the display is superimposed over the view of the real world through the eyeglasses); or be the screen of a vehicle-mounted device such as a tablet, laptop, or other customer computing platform. Interface 801 may be part of the mobile system/device 401 or 402 of FIG. 4 (e.g., the display 513 of FIG. 6 may comprise the display portion of interface 801 of FIG. 8 and user interface 514 of FIG. 6 may be the same as interface 801, e.g., including the display portion and one or more (not shown in FIG. 8) input devices such as a touch sensitive screen, mouse, track pad, keyboard, etc.). The user interface 801 may comprise audio output (e.g., a speaker) and audio input e.g., a microphone).

In this example, interface 801 displays video in window 803, which may comprise a portion of the display of interface 801. Video in window 803 may be video being sent and displayed in real time from another remote field officer, or it may be stored (e.g., locally) to allow display at a time convenient for the field officer receiving the video. Window 803 may also present audio information and other sensor information such as GPS, GIS, or other on-board system or operational information. Window 803 may also display textual information, such as text indicating events detected associated with video of window 803 (which may include events detected by analysis of the video of window 803 and/or other sensor information of sensors of the mobile system/device 401, 402 of the associated field officer 101, 111). The interface 801 may allow user authentication to allow an officer to log on to the system with a unique identifier (window 802) and has a window 804 to allow the user to define rules for transmission of sensor data, such as rich media, to third parties over the broadband network. Window 804 allows the user create a rule to have mobile system/device 401, 402 automatically perform some action upon the occurrence of a certain event or set of events. This detected event may constitute one or a set of occurrences as detected by sensing devices 102, and/or sensors 104 and/or event detection from analysis of video and/or still images provided by video or still image cameras. The action automatically performed by the mobile system/device 401, 402 may constitute transmission of an alert and/or selected sensor data, such as video or still images from a camera mounted on the vehicle of the mobile field officer 101, 111 or carried by the field officer 101, 111. In this example, the user has selected transmission of video, audio and other data (identified by LIST) to be sent to dispatch and shift command whenever flashers are on, the siren is on and the door of the vehicle is open. In this example AND Boolean logic is used. Other Boolean logic such as OR and/or NOT may be employed to allow for any combination of events. For example, automatic actions may be triggered when: door is open AND (siren is on OR flashers are on). As another example, automatic actions may be triggered when: weapon is fired AND ("always" but NOT at time 3:00 to 4:00) (e.g., to avoid practice at a firing range causing the associated automatic transmission). As another example, a rule may trigger an automatic action by combining vehicle stops AND vehicle is NOT located in a certain geographic area (alternatively, combining vehicle stops AND vehicle is located in a certain geographic area). The listed actions in window 804 are not exhaustive and a limited list is shown for ease of explanation. The example may include any of the actions representative of the sensor data of the sensors/sensing devices described herein, as well as information derived from processed sensor data. For example, the list of actions may include "vehicle stopped" and "vehicle at excessive speed" which may both be derived by processing speedometer sensor data (speed data) and may also include processing GPS data (e.g., to determine speed limits of the area in which the vehicle is traveling to compare with the speed of the vehicle to determine if the vehicle is traveling at excessive speed). In the example of FIG. 8, the user has also selected that video and audio be stored locally upon occurrence of these same events. The user may give this rule a particular rule name and store the same to be selected at a later time from one of the rules listed in a rule list, displayed in window 805. The list of available rules in window 805 allows the operator to activate and deactivate those rules at will.

There are many different and well known ways of defining a set of logical rules within a system (such as SQL, prolog, R++ and others). What is presented in FIG. 8 is an exemplary graphical representation of a logic programming means. For example, window 804 shows a list of potential trigger events such as emergency lights on or off, vehicle door open or closed, weapon unholstered, weapon discharged, and so on. This is list is obviously only exemplary, and other trigger conditions may be imagined. Window 804 further shows a list of potential responses to take if and when those trigger conditions have been met. For example, if a trigger condition is met; video, audio, or other data could be transmitted, stored, or ignored. If information (e.g., sensor data, such as video or still images) is transmitted, the interface may allow a field officer to specify who should be the recipient of that information. Using an interface such as this, a field officer can create a complex series of rules that describes how to manage sensor data, such as rich media, and associated information.

In addition to defining a rule, the interface may allow a user to provide a unique name to that rule and thus manage a set of such rules. Window 805 shows a list of rules that might be locally available on the mobile device or system. There are check boxes available for the local user to activate or deactivate those rules. Such rules of the rule list may be provided from a source external to the mobile system/device 401, 402, such as by sharing between officers and/or provided from central dispatch 108 or central command 109.

In the example of FIG. 8, selection of the third parties to which the automatically generated communication is generated is shown as "Dispatch," "Shift Command," "Other Officer" and "All local." The third parties may be selected to form groups which then may be stored for later selection, as done with respect to the rule list. The groups may dynamically change and be provided externally (e.g., by dispatch 108). For example, "on-duty officers" may constitute a group which changes with each change in on-duty shifts. The individual constituents of the "on-duty officers" may be provided to each mobile system/device 401, 402 externally, or alternatively, a communication to on-duty officers may be first routed to dispatch, which may then forward the communication to the individual constituents of the "on-duty officers".

In addition, groups of third parties to which the communication may be automatically sent may include personnel of neighboring districts or precincts outside the immediate authority of the district/precinct of the field officer. Communication to other districts/precincts may be triggered by detection of events and/or location information. For example, a rule may be associated with a high threat level to a field officer, such as a rule tracking a number of times a gun has been fired in a certain period of time, a rule detecting an officer has been injured (e.g., falling down analysis of a video of the officer), or a rule detecting the pressing of a "panic button" or "emergency help request" button. In determining a high threat level to a field officer, dispatch of a neighboring district or precinct (and/or field officers within a close distance of the neighboring district or precinct) may be selected as third party(ies) to which the automatic communication should be transmitted. As another example, location information, and/or direction of travel information may be used to select other districts or precincts for automatic communications. For example, during a pursuit of a suspect, a rule may trigger communications to a nearby neighboring district or precinct that may rely on one or more of the following triggers: the field officer is within a certain distance of the neighboring district or precinct: the field officer is heading in the direction of the neighboring district or precinct; the speed of the field officers vehicle is excessive; weapon fired; weapon safety released; or other sensor data indicating an increase threat level and/or pursuit.

In addition, groups of third parties that may automatically receive communications may belong to different types of agencies and may receive automatic communications based on rules providing event analysis relevant to that agency. For example, when the system is used by a police department, detection of a crash (e.g., sensing of deceleration and/or airbag deployment) or injury (e.g., sensing of a heart rate of zero) may automatically cause transmission of a communication (which may be an alert describing the detected event and/or sensor data such as images, location, officer name, etc.) to emergency medical services dispatch.

Additionally, or in the alternative, a field officer or a third party (e.g., a commander) may specify rules and conditions by which he or she can receive rich media and other sensor data. User interface 801 may be used to specify rules for receiving and display of data in the same manner described herein for setting rules for the transmission of information. For example a field officer may choose to receive all incoming messages, signals, data, and media when in a normal patrolling mode, but may set up rules to limit the receipt of information when engaged in an emergency activity. For example, if the lights or sirens of the field officer are turned on, the field officer may limit the incoming information to text and audio only—and not accept video. If the field officer's weapon is drawn, he or she may refuse to receive any incoming data originating from other field operatives, or accept incoming data to be stored locally for later display only. Any of the conditions or triggers discussed in this disclosure (e.g., those in block 502 or elsewhere) may be used in rules to limit the receipt of incoming information. Furthermore, a receiver may choose to receive (or refuse to receive) incoming information based on the priority-level of that transmission. The priority level can be manually set by the originating field officer, a person of rank such as a shift commander or squad leader, or by a rule within the system.

Alternatively or in addition, an indicator responsive to a detected event (e.g., a triggered rule) associated with the communication may be indicated (e.g., displayed, by sound (alarm or chime), vibration, etc.). The indicator may simply indicate the receipt of a new communication, or may also indicate the event or triggered rule with which the message is associated to assist the receiving field officer in determining whether or not or when to review the communication. For example, consider a rule of "gun fired" to automatically transmit video of the corresponding mobile system/device 401, 402 (e.g., from a vehicle or portable camera on the field officer who fired the gun (assume Officer Chan in this example)) to other field officers within a two mile radius. In this example, receiving field officers may receive a text indicator of "From Officer Chan: Gun Fired". Selection of the text may allow real-time communication of the video from Officer Chan so that responding field officers may immediately determine the threat level to Officer Chan as well as the type of threat to determine how to best respond.

The indicator received may also indicate a priority level of the communication or communication request. The priority level may be displayed (e.g., "low priority" "high priority" "emergency"). The priority level may also be used to determine how to route the message. For example, messages of low priority may be automatically stored for later retrieval and review. Messages of low priority may generate an indicator (e.g., one that is temporarily displayed for two or three seconds) or may simply be reviewed upon selection of stored messages for review by the user. Messages of high priority may automatically be accepted by the mobile system/device 401 and start communication of various information such as sensor data including video and/or still images. Messages of high priority may cause generation of an indicator that requests acceptance of the communication for immediate communications for the user (e.g., to immediately start display of sensor data including video and/or still images, such as in real-time with the generation of such sensor data from the transmitting mobile system/device 401). Such acceptance may be performed by selecting the indicator (such as by touching it when the interface 801 includes a touch screen, or "clicking" on the indicator by overlaying a cursor on the indicator and pressing a button of a mouse or touch pad). Such acceptance may be performed by voice command or sensing motion of the user. The user or other third parties (e.g., commander or dispatch) may set rules for the treatment of communications, communication requests and/or the associated communication indicators as described herein based on the priority of the communication received. E.g., the field officer may set the mobile system/device 401 to, during the shift of the officer, accept communications of priority levels 3-5 for immediate display (or other type of communication, such as sound), limit communications of priority level 2 to request acceptance for immediate communications by selecting the associated indicator, and route communications of priority level 1 for local storage for later review. The field officer may set a different type of treatment of communications during a different time. For example, the mobile system/device 401 may be programmed to receive off shift communications for immediate display (or immediate communication with the user for other communication types) only when the priority is 4 or 5, to accept messages having communication levels of priority 3 for display (or other appropriate communication) upon selection of an associated message indicator, and to ignore or discard all communication requests of priority 2 or lower.

The indicator may also include images associated with the incoming communication, such as briefly showing the images in window 803. Or the indicator may be a "picture-in-picture" type of display to show an image associated with the incoming communication within a portion (such as a corner) of another window, such as in a corner of window 803. The receiving field officer may select the communication (e.g., by tapping the picture within picture display) to expand the picture to receive the full video communication (and which may also include other sensor data including event descriptions, location, etc.).

Acceptance and/or non-acceptance of the incoming communication by one of the mobile systems/devices 401 may be used as a rule for determining a transmission of the communication to another one of the mobile systems/devices 401. For example, an first mobile system/device 401 may, in response to triggering a rule or a certain set of rules, automatically initiate a communication request to send sensor data (such as video) with an automatic message (e.g., such as a request for backup assistance) or otherwise communicate to officers within a first geographical distance (e.g., within one mile of the first mobile system/device 401). If there is no officer which is within the first geographical distance, or there is no officer within the first geographical distance that accepts the communication request (e.g., by selecting the indicator to establish a communications link, e.g., to receive sensor data such as video and/or images) within a certain time period (e.g., within 20 to 30 seconds), the first mobile system/device 401 may recognize the lack of acceptance and initiate a communication request to send the sensor data to officers within a second, larger, geographical distance (e.g., within two miles of the first mobile system/device 401).

In addition, a mobile field officer may indicate through the corresponding mobile system/device 401 that they are responding to the transmitting officer (e.g., they are traveling to the transmitting officer to provide support/backup). Such indication of responding to the transmitting officer may be done by selecting, by the receiving officer, some additional indicator (e.g., a "Will respond" "button" on the display by tapping, clicking, etc.) and transmitting corresponding information to the transmitting officer via corresponding mobile system/devices 401. Upon receipt of the information indicating a particular officer is responding, the transmitting mobile system/device 401 may initiate transfer of a new set of information, such as video and/or still image sensor data for receipt and display on the mobile system/device 401 of the responding officer. Rules and/or a commander and/or dispatch may be used to limit or exclude further receipt of communications and sensor data based upon the indication of the mobile field officer that he/she is responding, a determined threat level associated with the transmitting officer to which the receiving officer is responding (or other analysis of the sensor data of the transmitting officer) and/or sensor data (e.g., video and/or still images) received by the receiving officer.

In addition, or in an alternative embodiment, information to be sent to the mobile system/device 401 of a field officer receiving a request for a communication may be selected by the receiving officer. For example, upon receiving a request for a communication (or an initial set of sensor data, such as a text message automatically generated by the triggering of a rule, rule set or other event detection), the receiving field officer may select a message indicator corresponding to the communication request (or initial set of sensor data) to accept the communication. Accepting the communication in this manner may allow selection by the receiving field officer of certain sensor data—e.g., in response to selection of the message indicator, the receiving field officer may view a pop-up menu list on the interface 801 listing various options for sensor data receipt, such as video, voice, text messages associated with triggered rules (e.g., "gun drawn"), etc.

As another example, consider a pair of field officers deployed to disable a vehicle pursued by a third field officer five miles ahead of the pursued vehicle. The first field office of the pair of field officers may act as a spotter to try to see the approaching vehicle and provide details, such as which lane the car is in, the color of the car, speed, occupants, etc. to the second field officer. The spotter may have a pair of night vision binoculars that may comprise a camera (or cameras) connected to two small video monitors (e.g., in place of the eye pieces of the binoculars). In this example, the spotter may select one or more of the following images in the binocular video monitor eye pieces: (a) the live video image from the binocular camera, (b) the live video image of his partner of the spotter, (c) the live image from the third field officer pursuing the vehicle, and (d) a recorded video image previously taken identifying details of the car and/or occupants of the car (e.g., provided by dispatch). Initially, the spotter may determine what information is sent to the partner of the spotter whose job it is to disable the vehicle. The spotter may select the video feeds and provide voice description over the communications channel to his partner. The partner of the spotter may act to override the information being received, such as by switching modes of his mobile system/device 401, to view just the live view of his/her camera when the vehicle is near so as not to be distracted. The partner may then act to disable the vehicle with updated information (e.g., by shooting a tire of the vehicle or deploying a spike strip on the road at the appropriate time). To assist in the switching of multiple video options during a limited (and possibly stressful) time period, the mobile system/devices 401 may be set to allow for different video image display during different modes. For example, the modes may be (a) Off, (b) On, (c) Setup, (d) Prep and (e) Firing. During setup mode, multiple videos may be displayed simultaneously for the spotter and his partner. As the vehicle gets closer, the mode may be switched (e.g., by the spotter) to prep mode. During prep mode, the display may be limited to video of the spotter and his partner. As the vehicle gets very close, the mode may be switched to firing (e.g., by the partner of the spotter). During firing mode, each device may only display its own video to minimize distraction. Modes may be changed by many methods, such as use of the interface 801 (e.g., by voice activated commands and/or buttons and/or selection of display indicators, as discussed elsewhere herein).

Figure 9:
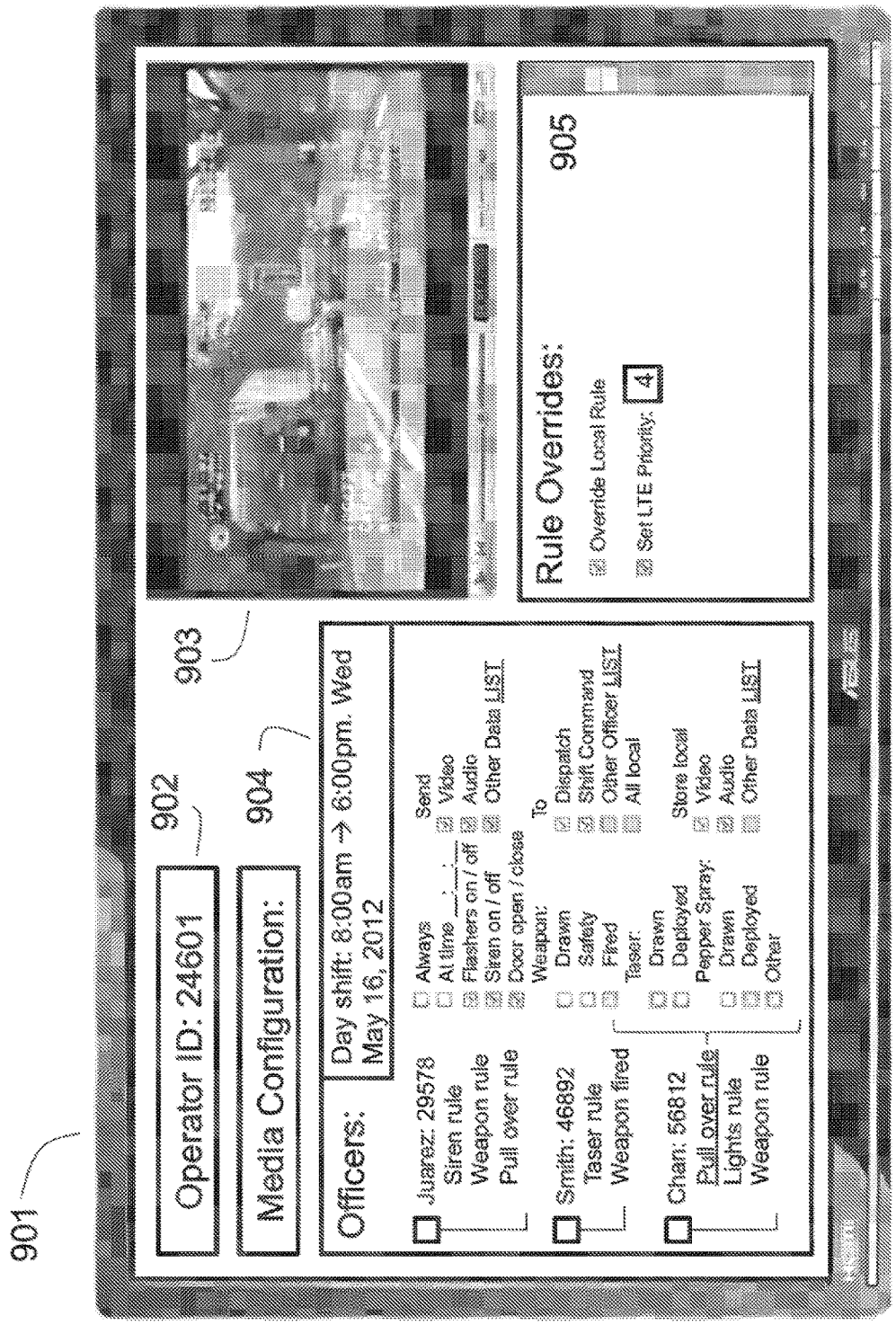
FIG. 9 shows an exemplary interface for a shift commander or other authorized personnel to configure the system and create rules.

FIG. 9 shows an example of a configuration tool that may be employed by a shift commander or precinct commander or other authorized personnel at a central location. This configuration tool may be implemented with software on a personal computer that may be part of a communications network comprising the broadband network 107. The configuration tool may be mobile, such as implementing the configuration tool with a laptop or handheld computing device (e.g., a smart phone containing a configuration application). The configuration tool may include interface 901 to allow a shift commander to create rules specific to an individual field officer or to a group of field officers. Interface 901 may allow a shift commander to view the rules of multiple field officers. Interface 901 may allow a shift commander to activate/deactivate, modify, or reprioritize rules for one or more field officers.

Rules set for receiving communications may be different for different time periods. During a first time period, e.g., a time period associated with an on-duty shift of the field officer, communications of a certain priority level (e.g., all priorities) may be received and immediately communicated to the receiving officer (or received with an alert to be selected for immediate communication). During a second time period, e.g., a time period associated with an off-duty time period of the field officer), only communication of a higher priority may be immediately communicated or received with an alert. Other lower priority communications may be stored for later review or may be ignored.

The interface 901 may be available to a shift commander or other authorized user on a computing platform monitor (such as a PC monitor, touch screen, tablet, laptop, or other computing platform display). The interface 901 performs user authentication and allows an authorized user to log in (window 902). The interface 901 allows the user to view live or recorded rich media and associated information in window 903 from local storage (block 415, 416, and 417) or from a remote field officer's sensing device/storage system (e.g., in real time or by accessing video, still images and/or other sensor data stored locally in a remote field officer's mobile system/device 401).

Window 904 is an example of how an operator may configure a network of mobile systems/device 401, 402. Window 904 may include information about the shift to which it pertains, such as date and time information. It may contain a list of officers on the shift and rules that may be available on their local systems for selection. It may also contain a list of global rules that may be managed centrally. In this instance, the interface is showing a particular rule called the "Pull over rule" which is hosted on the remote system of officer Chan (#56812). The description of the rule is exactly the same as officer Chan would see on her remote system. The shift commander can view this rule or modify it and send it back to officer Chan's remote system.

Additionally, interface 901 allows the shift commander or other authorized personnel to create overrides for this rule via window 905. Specifically, the shift commander may create a new rule or modify an existing rule and override the settings the field officer created for that rule. Use of the interface 901 to create or modify a rule may be the same as that described herein for interface 801.

Furthermore, communications may be given a priority level. The priority level may be determined or selected based on one or more of the following factors: (a) the field officer from which the mobile system/device 401, 402 is associated (e.g., higher ranking officers or those with more dangerous assignments may be given higher priority or priority weighting) (b) the triggering event as detected by the rule (e.g., a rule detecting "weapon fired" may be given a higher priority or weighting than an event detected by the "pull-over rule") and (c) external override or manual override information (e.g., a "weapon drawn" event detection may have its priority reduced by a commander or other authorized personnel if it is determined that batons are being withdrawn as part of a riot prevention/crowd control exercise—for example, a central station may reducer or eliminate priority to baton withdrawn triggers for field officers within a certain geographical area, which may be recognized by sensing unusual sensing data patterns, such as unusual numbers of baton withdraw triggers being withdrawn as compared to normal daily routines, and investigating the same). An estimated threat level may be determined based on one or more of these factors (a)-(c) and used to determine the communications priority. A weighting system may be used to provide several weighting values to determine the communication priority to be assigned e.g., an officer assigned to patrol a neighborhood considered dangerous may be given a weighting value of 0.6 where those of neighborhoods considered safe may be given a weighting value of 0.3. A "pull-over" rule may be given a weighting of 2, while a baton drawn may be given a weighting value of 3. Thus, a detected "pull-over" event may be given a value of 1.2 (0.6×2) for one officer and a 0.6 (0.3×2) for another officer; a baton drawn by one officer may result in a value of 0.9 (0.6×3) for one officer and 1.8 (0.6×2) for another officer (and these numbers used to determine a communications priority). Thus, communication priorities may be dynamically determined in real-time in response to event detection by the mobile system/device 401, 402. Commanders may be given higher priority for most or all communications to assure commands are properly received and implemented. Priority of communications of commanders and/or mobile field officers may be dynamically determined based on event detection (and/or a determined threat level) of others, such as based on event detection of another mobile field officer to which the commander is communicating, or based on event another mobile field officer that other officers are within a certain distance. The communications network (e.g., FirstNet, LTE, 4G) may allow individual communications to be assigned priority levels and use these priority levels to automatically allocate bandwidth and/or quality of service for each communication channel or link. As bandwidth on the communications network (e.g., broad band network 107) becomes congested, traffic with lower priority may be dropped or given lesser quality of service in favor of traffic with higher priority. An operator may dynamically specify the priority of the data from a specific officer or sensor and thus dynamically adjust priority of communications across the network. For example, video data from a public event such as a music concert may be given a low priority (e.g., officers assigned to monitor the music concert may be given a low communications priority weighting), but a rule may be created whereby, if an officer assigned to that concert should unholster his or her weapon indicating a potentially threatening event, that video may be dynamically given a higher priority so it will be guaranteed to be transmitted even if the broadband network becomes congested.

The above-disclosed subject matter is to be considered illustrative, and not restrictive. Many alternatives embodiments are intended to fall within the scope of the invention. For example, the above description references remote mobile field officers and discusses sensor data, event detection and triggering rules related to field officers, such as police department officers. However, the invention is not limited to such and can be applied to other first responder environments or private third party environments (e.g., shipping, oil rig maintenance, construction). In addition, it should be emphasized that many different types of sensors and sensor data may be used in both the event detection and sending of information. The use of video and/or still images has been described with respect to many of the embodiments but the invention has broader applicability. For example, use of sensor data to automatically establish voice or text communications (with or without images) is contemplated. The appended claims are intended to cover all such modifications, enhancements, and other embodiments, which fall within the true spirit and scope. Thus, to the maximum extent allowed by law, the scope is to be determined by the broadest permissible interpretation of the following claims and their equivalents, and shall not be restricted or limited by the foregoing detailed description.

What is claimed is:

1. A method wireless communication, comprising:
    detecting one or more events at a location of a mobile first responder;
    determining a communication priority level in response to the detecting of one or more events;
    establishing a first wireless communication from the mobile first responder in a wireless communication system having a plurality of communication priority levels including the determined communication priority level, the determined wireless communication level being assigned to the first wireless communication.

2. The method of claim 1, further comprising:
    determining a threat level to the mobile first responder based upon the detecting of the one or more events; and
    determining the communication priority level in response to the determined threat level.

3. The method of claim 2, wherein the detecting one or more events comprises detecting a change in the state of a weapon of the first responder.

4. The method of claim 3, wherein the detecting one or more events comprises detecting at least one of: unholstering a weapon, putting a safety mechanism of a weapon in an off state, firing a weapon and deploying a weapon.

5. The method of claim 2, wherein the detecting one or more events comprises detecting a stress level of the first responder.

6. The method of claim 5, wherein detecting the stress level of the first responder comprises monitoring a heart rate of the first responder.

7. The method of claim 1, wherein detecting one or more events comprises detecting the status of a vehicle associated with the first responder.

8. The method of claim 7, wherein detecting the status of the vehicle associated with the first responder comprises detecting a speed of the vehicle.

9. The method of claim 1, wherein the plurality of communication priority levels of the wireless communication system are used by the wireless communication system to determine a bandwidth of plural communication links of the wireless communication system.

10. The method of claim 1, wherein the plurality of communication priority levels are used by the communication system to determine which of plural communication links of the wireless communication system to terminate in the event of over congestion of the communication system.

11. The method of claim 1, further comprising:
    establishing the first wireless communication with the mobile first responder and an additional party, wherein the additional party is selected in response to the determined communication priority level.

12. The method of claim 11, further comprising:
    the additional party selecting rules for receiving communications, and
    establishing the first wireless communication with the mobile first responder and the additional party in response to the determined communication priority level and the rules selected by the additional party.

13. The method of claim 1, wherein establishing the first wireless communication with the first mobile responder is automatically established in response to the detecting of the one or more events.

14. The method of claim 13, wherein the first wireless communication transmits images taken from the location of the first responder.

15. The method of claim 14, wherein the images taken from the location of the first responder are transmitted in real time.

16. The method of claim 14, wherein the images are video images.

17. A mobile communications device, comprising:
    one or more sensors configured to sense respective information at the location of the mobile communications device and to provide respective sensor data;
    a rules engine processor configured to receive the sensor data, to analyze the sensor data to detect one or more events, and to determine a communications priority based on the detected one or more events; and
    a transmitter configured to establish a communication over a wireless network with the communications priority determined by the rules engine processor, the communications priority effective to determine a communications mode for the communication by the wireless network.

18. The mobile communications device of claim 17, further comprising a processor configured to automatically initiate a transmission of sensor data information with the communication.

* * * * *